United States Patent
Shaheen

(10) Patent No.: US 10,694,444 B2
(45) Date of Patent: Jun. 23, 2020

(54) UE-BASED EXPEDITED HANDOFF

(71) Applicant: Sharp Laboratories of America, Inc., Camas, WA (US)

(72) Inventor: Kamel M. Shaheen, Camas, WA (US)

(73) Assignee: Sharp Laboratories of America, Inc., Vancouver, WA (US)

( * ) Notice: Subject to any disclaimer, the term of this patent is extended or adjusted under 35 U.S.C. 154(b) by 155 days.

(21) Appl. No.: 15/863,614

(22) Filed: Jan. 5, 2018

(65) Prior Publication Data
US 2018/0192347 A1    Jul. 5, 2018

Related U.S. Application Data

(60) Provisional application No. 62/442,868, filed on Jan. 5, 2017.

(51) Int. Cl.
| | |
|---|---|
| *H04W 36/36* | (2009.01) |
| *H04W 36/08* | (2009.01) |
| *H04W 36/00* | (2009.01) |
| *H04W 36/02* | (2009.01) |
| *H04W 74/08* | (2009.01) |
| *H04W 84/04* | (2009.01) |

(52) U.S. Cl.
CPC ....... *H04W 36/36* (2013.01); *H04W 36/0077* (2013.01); *H04W 36/08* (2013.01); *H04W 36/023* (2013.01); *H04W 74/0833* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 2008/0293419 A1* | 11/2008 | Somasundaram | H04M 15/7657 455/437 |
| 2010/0130212 A1* | 5/2010 | So | H04W 36/08 455/444 |
| 2012/0170550 A1* | 7/2012 | Chao | H04L 1/1854 370/331 |
| 2013/0201904 A1* | 8/2013 | Toskala | H04W 36/08 370/315 |
| 2014/0022972 A1* | 1/2014 | Ahn | H04W 36/0072 370/311 |
| 2014/0135008 A1* | 5/2014 | Yu | H04W 36/0077 455/436 |
| 2015/0105084 A1* | 4/2015 | Bontu | H04W 36/0072 455/437 |

(Continued)

OTHER PUBLICATIONS

Ericsson, "Inter-cell Handover in NR", 3GPP TSG-RAN WG2 Meeting #96, Reno, Nevada, USA, R2-168730, Nov. 18, 2016.

(Continued)

*Primary Examiner* — Ajit Patel
(74) *Attorney, Agent, or Firm* — Austin Rapp

(57) ABSTRACT

A 5G new radio (NR) user equipment (UE) is described. The UE includes a processor and memory in electronic communication with the processor. Instructions stored in the memory are executable to perform a UE-initiated handoff (HO) procedure after enablement from a base station (gNB). The UE-initiated HO procedure may include a PUSH mechanism in handoff. Alternatively, the UE-initiated handoff procedure comprises a PULL mechanism in handoff.

16 Claims, 24 Drawing Sheets

(56) References Cited

U.S. PATENT DOCUMENTS

| | | | | |
|---|---|---|---|---|
| 2015/0111580 A1* | 4/2015 | Wu | ................... | H04W 36/0005 |
| | | | | 455/436 |
| 2015/0304913 A1* | 10/2015 | Uusitalo | ............... | H04W 36/02 |
| | | | | 455/444 |
| 2016/0057687 A1* | 2/2016 | Horn | ..................... | H04W 24/10 |
| | | | | 370/331 |
| 2016/0323800 A1* | 11/2016 | Ulupinar | ............... | H04W 36/38 |
| 2017/0070923 A1* | 3/2017 | Li | ..................... | H04W 36/0066 |
| 2017/0215117 A1* | 7/2017 | Kwon | ..................... | H04B 7/04 |
| 2017/0303169 A1* | 10/2017 | Hampel | ................. | H04W 76/12 |
| 2017/0311217 A1* | 10/2017 | Jung | ..................... | H04W 36/04 |
| 2018/0070403 A1* | 3/2018 | Uemura | .................. | H04W 4/70 |
| 2018/0302834 A1* | 10/2018 | Zhang | ................... | H04W 36/08 |
| 2019/0075498 A1* | 3/2019 | Yiu | ................... | H04W 36/0022 |

OTHER PUBLICATIONS

Samsung, "Mobility in NR Connected-Active", 3GPP TSG-RAN WG2 Meeting #96, Reno, USA, R2-167521, Nov. 18, 2016.
Qualcomm Incorporated, Convida Wireless, "RRC procedures for network based and UE based mobility", 3GPP TSG-RAN WG2 Meeting #96, Reno, US, R2-168597, Nov. 18, 2016.

* cited by examiner

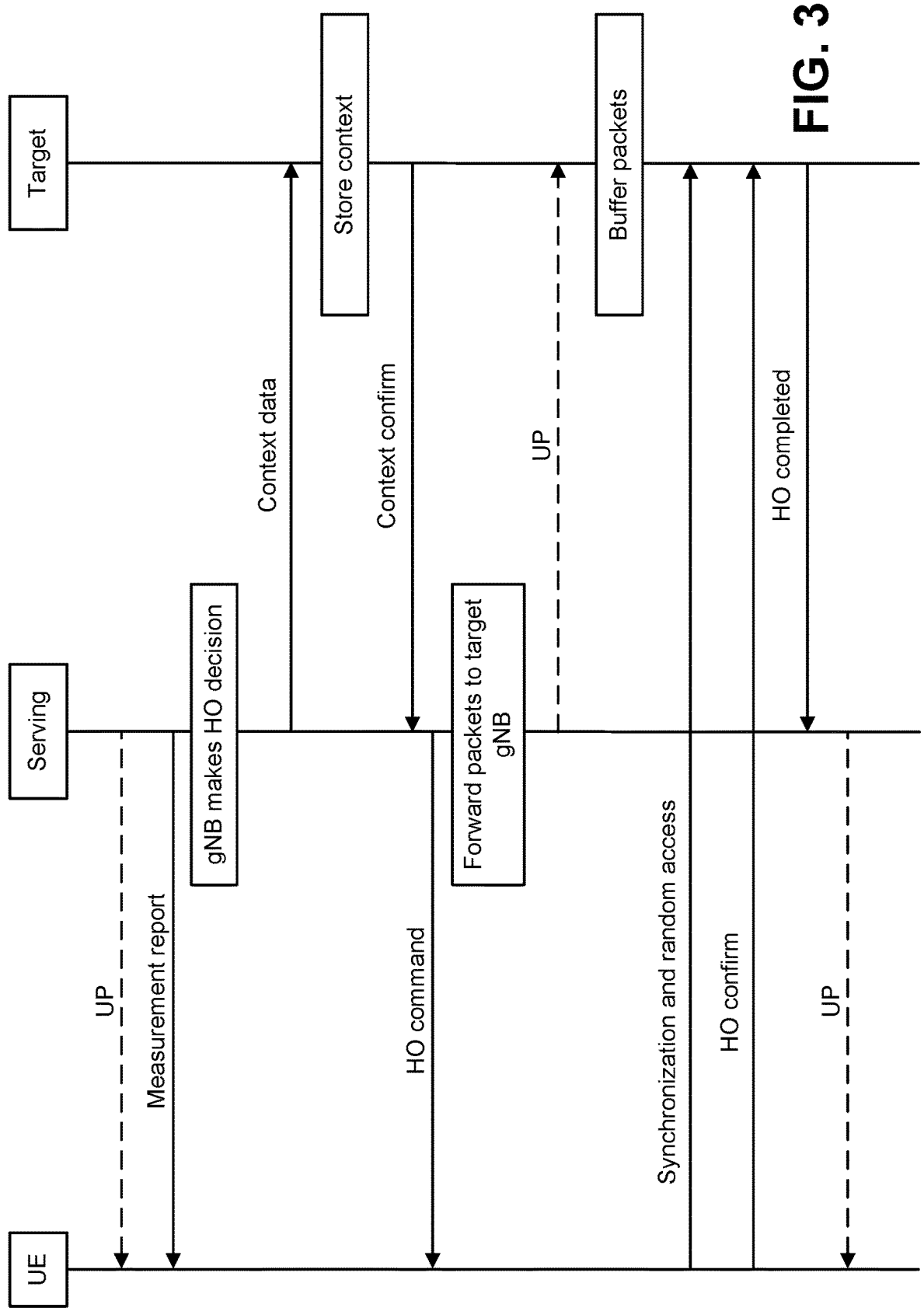

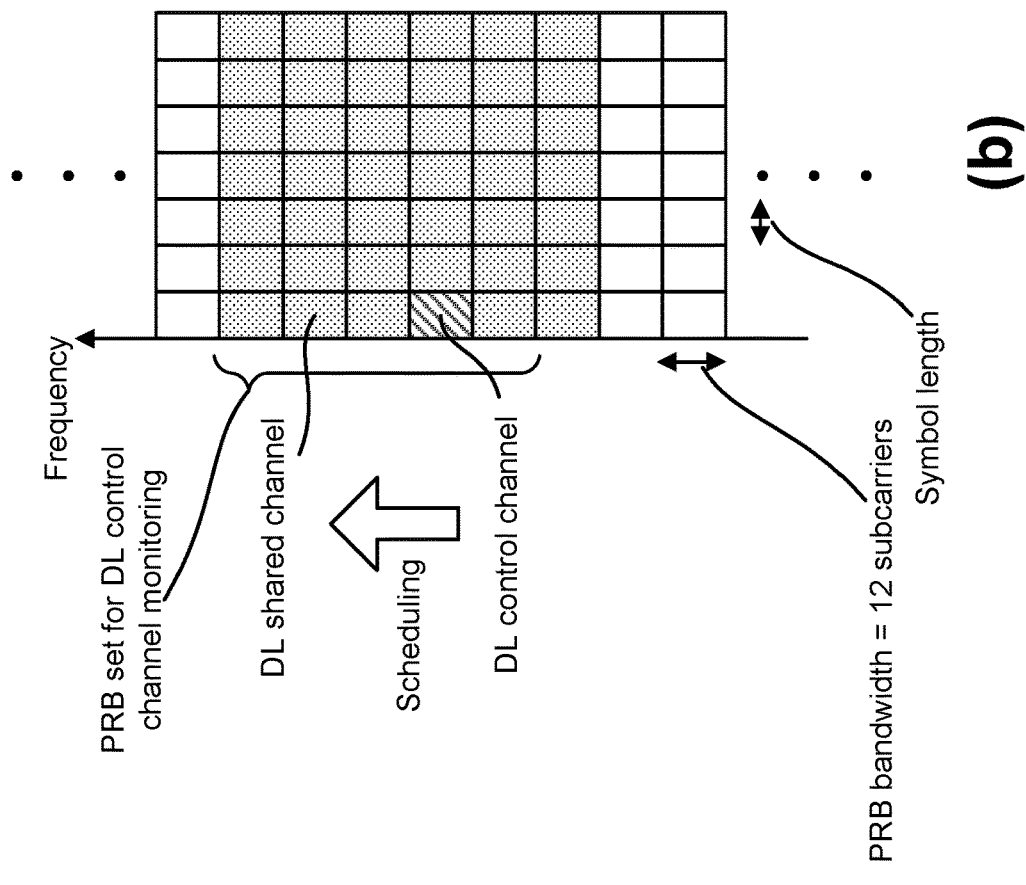
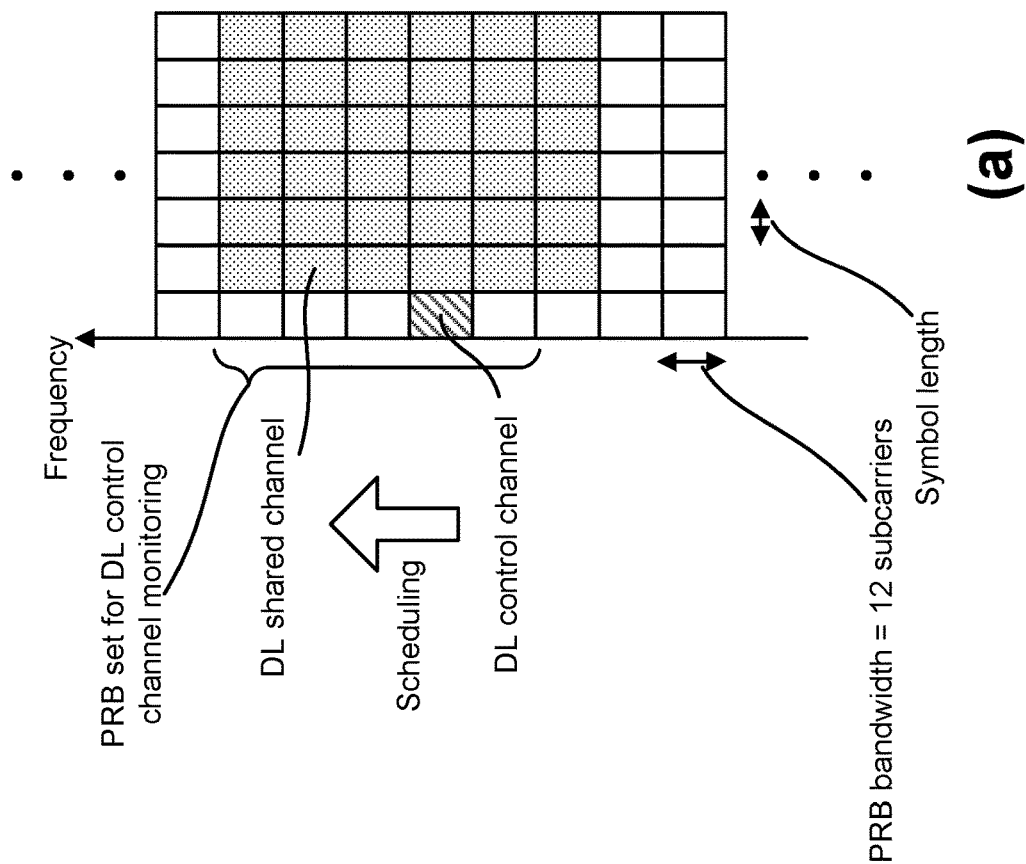
FIG. 15

UE-BASED EXPEDITED HANDOFF

RELATED APPLICATIONS

This application is related to and claims priority from U.S. Provisional Patent Application No. 62/442,868, entitled "UE-BASED EXPEDITED HANDOFF," filed on Jan. 5, 2017, which is hereby incorporated by reference herein, in its entirety.

TECHNICAL FIELD

The present disclosure relates generally to communication systems. More specifically, the present disclosure relates to 5G new radio UE-based expedited handoff.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIG. 3 is a call flow diagram illustrating a baseline HO procedure for new radio (NR);

FIG. 15 shows examples of DL control channel monitoring regions;

DETAILED DESCRIPTION

Figure 1:
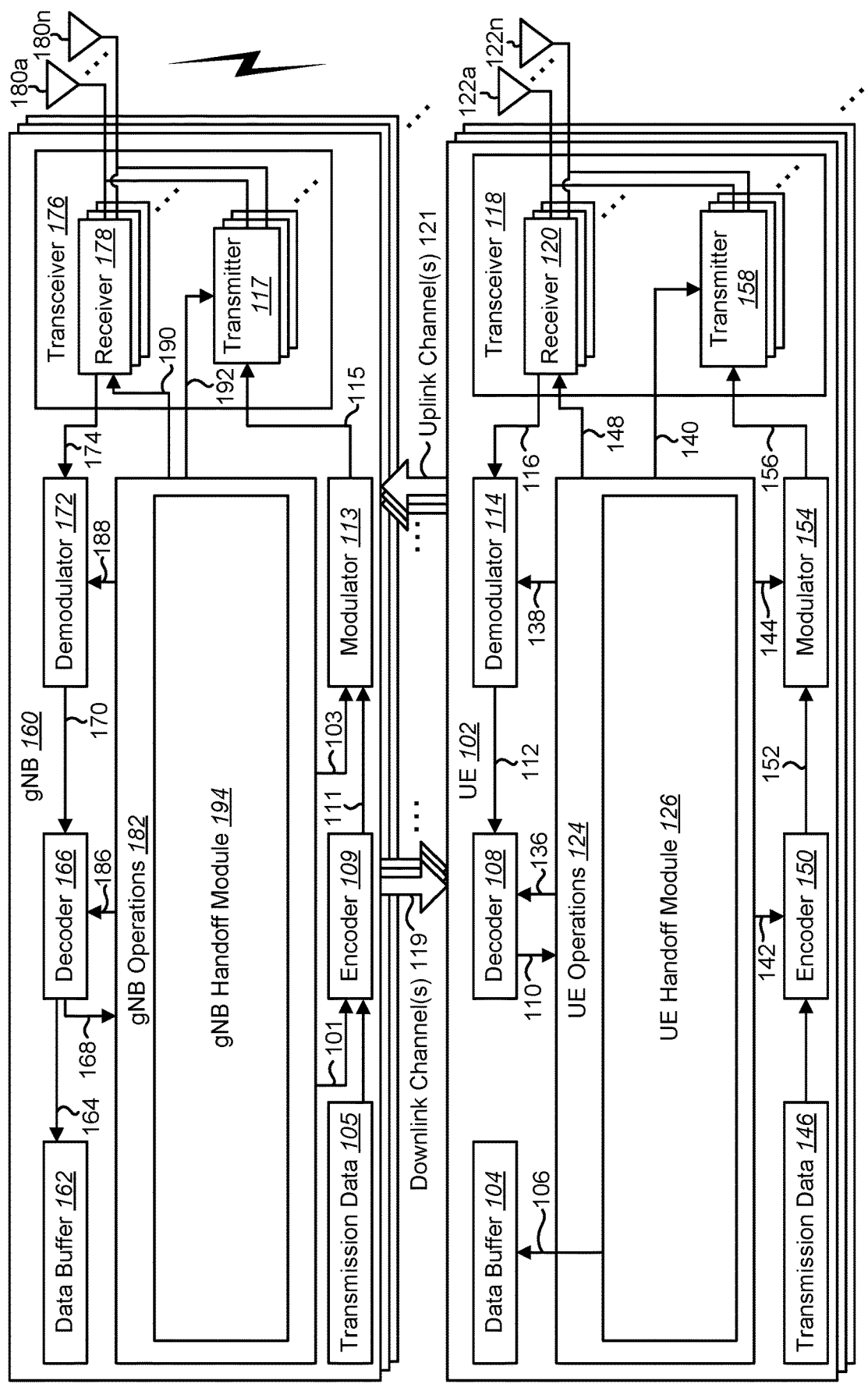
FIG. 1 is a block diagram illustrating one implementation of one or more base stations (gNBs) and one or more user equipments (UEs) in which systems and methods for UE-based expedited handoff (HO) may be implemented.

A 5G new radio (NR) user equipment (UE) is described. The UE includes a processor and memory in electronic communication with the processor. Instructions stored in the memory are executable to perform a UE-initiated handoff (HO) procedure after enablement from a base station (gNB).

The UE-initiated HO procedure may include a PUSH mechanism indicating to a source gNB its handoff decision. The UE-initiated HO procedure informs the source gNB with a target gNB ID. In the PUSH mechanism, a source gNB may perform HO preparation procedures by establishing a forwarding tunnel and pushing UE contexts to the target gNB.

In the PUSH mechanism, the UE may receive a Security Handoff Vector generated by the target gNB. The UE may send the Security Handoff Vector to the target gNB during the synchronization and HO-based Random access procedure. The UE may send an Indication that this Random Access is Handoff-Based to the target gNB. The UE may continue to use source gNB keys to receive and transmit data relayed/forwarded through the Target gNB. The UE may update its keys with the Target gNB.

The UE-initiated handoff procedure may include a PULL mechanism in handoff. In the PULL mechanism, a target gNB informs the Source gNB of the impending HO, establishing Forwarding data tunnel, and requests the UE context. The UE may make a HO decision based on measurements, accessing a target gNB with an HO indication.

The UE may provide an HO Vector during the Handoff procedure. The UE may send the Security Handoff Vector to the target gNB during the synchronization and HO-based Random access procedure. The UE may send an Indication that this Random Access is Handoff-Based to the target gNB. The UE may continue to use source gNB keys to receive and transmit data relayed/forwarded through the Target gNB. The UE may update its keys with the Target gNB.

The UE-initiated HO procedure may include using a handoff vector to expedite UE validation and access in a target gNB. The UE-initiated HO procedure may include relaying UE plane data (e.g., Uplink (UL) and Downlink (DL)) between a source gNB and a target gNB using source gNB keys.

The UE-initiated HO procedure may include establishing target gNB keys with the UE and establishing a backbone connection between a target gNB and CN in the background while the UE data is continuously flowing through the target gNB and over the air.

A 5G new radio (NR) Base Station (gNB) is also described. The gNB a processor and memory in electronic communication with the processor. Instructions stored in the memory are executable to perform a UE-initiated handoff (HO) procedure.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a gNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB or gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio", "New Radio Access Technology" or "NR" by 3GPP) envisions the use of time/frequency/space resources to allow for enhanced mobile broadband (eMBB) communication and ultra-reliable low latency communication (URLLC) services, as well as massive machine type communication (mMTC) like services. In order for the services to use the time/frequency/space medium efficiently it would be useful to be able to flexibly schedule services on the medium so that the medium may be used as effectively as possible, given the conflicting needs of URLLC, eMBB, and mMTC. An NR base station may be referred to as a gNB. A gNB may also be more generally referred to as a base station device.

The systems and methods described herein provide an expedited handoff (HO) process performed by UE initiated handoff procedures. The process will allow a fast admission process at a target cell where a handoff vector is passed to the UE prior to handoff and is used to validate the UE in the new cell while the normal time consuming procedures are taking place in the background. The UE will be able to use the source gNB encryption in the new target gNB which relays packets back and forth with the source gNB. The relay operation continues until the target gNB establishes all user plane connections to the core network and new keys are established with the UE. Afterwards, the Relay operation is terminated and normal operation proceeds.

Two mechanisms are introduced: the PULL mechanism and PUSH mechanism. In the PULL mechanism, the source gNB informs the target gNB and prepares the HO process. In the PUSH mechanism, the target gNB performs the HO procedures by establishing the forwarding tunnel and requesting UE contexts.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for UE-based expedited handoff may be implemented. The one or more UEs 102 communicate with one or more gNBs 160 using one or more physical antennas 122a-n. For example, a UE 102 transmits electromagnetic signals to the gNB 160 and receives electromagnetic signals from the gNB 160 using the one or more physical antennas 122a-n. The gNB 160 communicates with the UE 102 using one or more physical antennas 180a-n.

The UE 102 and the gNB 160 may use one or more channels and/or one or more signals 119, 121 to communicate with each other. For example, the UE 102 may transmit information or data to the gNB 160 using one or more uplink channels 121. Examples of uplink channels 121 include a physical shared channel (e.g., PUSCH (Physical Uplink Shared Channel)), and/or a physical control channel (e.g., PUCCH (Physical Uplink Control Channel)), etc. The one or more gNBs 160 may also transmit information or data to the one or more UEs 102 using one or more downlink channels 119, for instance. Examples of downlink channels 119 physical shared channel (e.g., PDSCH (Physical Downlink Shared Channel), and/or a physical control channel (PDCCH (Physical Downlink Control Channel)), etc. Other kinds of channels and/or signals may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more physical antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE handoff module 126.

The UE handoff module 126 may perform an expedited handoff (HO) process performed by UE initiated handoff procedures. Some progress has been achieved concerning the relation between beamformed mobility reference signals (RSs) for Radio Resource Management (RRM) measurements in CONNECTED mode and the NR cell, initially agreed to be associated to Idle mode operation. There may be a relation between beamformed mobility reference signals (MRSs) and the NR cell. Inter-cell handover based on the concept of a cell being defined by its beamformed mobility reference signals (MRSs) which contains at least a beam ID is discussed herein.

The LTE HO procedure is described herein. In LTE, a UE 102 in RRC CONNECTED state is configured with event based report triggering criteria. Measurements are configured to be done primarily based on Cell-specific Reference Signal (CRSs), transmitted all over the carrier frequency and in all subframes. Based on Physical Cell Identifiers (PCIs), the UE 102 is able to derive the CRS of serving and neighbor cells. There is a one-to-one mapping between the PCI and CRSs. An example of an LTE HO procedure is described in connection with FIGS. 2A-2B.

Once a triggering criterion has been met, the UE 102 sends a measurement report to the Source eNB via RRC. The measurement reporting parameters provided by the network aim to minimize both ping-pong as well as handover failures. For intra-frequency mobility this is typically achieved by configuring an A3 measurement event so that a report is triggered when a neighbor cell is found to be a few decibels (dB) better than the serving cell. Due to measurement errors in bad radio conditions and due to the necessary filtering, the actual difference in signal strength may be worse than anticipated by the configured event threshold. A consequence of this is that many measurement reports and the subsequent mobility related RRC signaling are exchanged in challenging radio conditions and are hence error prone. In summary, LTE handover involves RRC signaling over degrading radio links (from the source cell to the UE 102) which may cause undesired latency and high failure probability.

The baseline NR HO procedure is also described herein. It is natural to design the baseline NR HO procedure based on the LTE procedure described above regardless of how the different procedures will need to be adjusted to the fact that DL mobility reference signals (MRSs) need to be beamformed and carry a beam ID and multiple of these MRSs would be associated to the source cell while other MRSs would be associated to the target cell. This baseline procedure is shown in FIG. 3.

Even though the baseline HO procedure is very similar to the LTE procedure on a high level, the details of several steps will differ. This discussion focuses on the handover execution (i.e., steps 4 to 6 in FIG. 3). The measurement report contents will also need to be updated to support beam based mobility.

The assumption here is that the UE 102 should be able to map an NR cell ID to a group of beamformed mobility RSs with beam IDs associated to it by some of the solutions being discussed. For example, by dedicated signaling, the UE 102 knows that a given range of MRSs belong to a given cell and/or a broadcasted mobility RS encodes a beam ID that also encodes a cell ID. Therefore, regardless of what the final solution is a handover command containing a cell ID should enable the UE 102 to identify a single beam and/or multiple beams associated to a target cell.

The different alternatives for the handover execution can be classified by the information contained in the handover command and the corresponding synchronization and random access procedure. Different alternatives are listed in Table 1.

TABLE 1

|  | 4. HO command contents | 5. Sync and random access |
|---|---|---|
| Alternative 1 | Cell identity only. Note that the cell identity can be signaled either explicitly or implicitly via e.g. MRS configuration (see [XX] for more details) | UE autonomously selects the strongest beam associated to the indicated cell identity. UE reads the random access parameters from system information and uses those for the initial access on the selected beam |
| Alternative 2 | Cell identity + PRACH configuration Multiple PRACH configurations may be provided to enable different RA parameters for different beams or beam groups | UE autonomously selects any beam associated to the indicated cell identity. UE uses the random access parameters from the HO command and uses those for the initial access on the selected beam |
| Alternative 3 | Cell identity + PRACH configuration + list of allowed beams Multiple PRACH configurations may be provided to enable different RA parameters for different beams or beam groups | UE autonomously selects a beam from the list of provided beam IDs associated to the indicated cell identity. UE uses the random access parameters from the HO command and uses those for the initial access on the selected beam |
| Alternative 4 | Cell identity + PRACH configuration + indication of allowed beam | UE synchronizes to the beam ID provided in HO command with provided cell identity. UE uses the random access parameters from the HO command and uses those for the initial access |
| Alternative 5 | Cell identity + PRACH configuration + list of allowed beams + mapping between beams and a RA preamble | UE autonomously selects a beam from the list of provided beam IDs with correct cell identity. UE uses the random access parameters from the HO command and uses the preamble corresponding to the selected beam to indicate to the network which beam it selected. |

In alternative 1, the UE 102 receives a handover command which contains a target cell identity. This target cell identify may be explicitly signaled, or may be derived from other parameters, such as configuration of mobility reference signals. Upon receiving the handover command, the UE 102 will autonomously find a beam with a correct cell identity, read the corresponding system information matching the beam and cell, and make a random access using contention based random access procedure. This has the benefit of requiring the least signaling and network configuration but may result in a handover failure if there are other UEs competing for the random access at the same time.

In alternative 2, the UE 102 receives a handover command which contains a target cell identity and a random access configuration. This target cell identify may be explicitly signaled, or may be derived from other parameters, such as configuration of mobility reference signals. Upon receiving the handover command, the UE 102 will autonomously find a beam with a correct cell identity, and make a random access using the random access configuration provided in the handover command. This has the benefit of allowing network to provide a dedicated handover configuration for the UE 102, but requires some additional configuration and signaling.

In alternative 3, the UE 102 receives a handover command which contains a target cell identity, a random access configuration and a list of allowed beams. This target cell identify may be explicitly signaled, or may be derived from other parameters, such as configuration of mobility reference signals. The list of beams may also be explicitly signaled, or may be derived from other parameters such as configuration of the mobility reference signals. Upon receiving the handover command, the UE 102 will select a beam with both correct cell identity and an allowed beam identify. It will then make a random access using the random access configuration provided in the handover command. This has the benefit of allowing network to provide a dedicated handover configuration for the UE 102, and limiting the number of possible beams the UE 102 may end it, but requires additional configuration and signaling. The UE 102 may also end up in a non-optimal beam.

In alternative 4, the UE 102 receives a handover command, which contains a target cell identity, a random access configuration and a target beam identity. This target cell identify may be explicitly signaled, or may be derived from other parameters, such as configuration of mobility reference signals. The target beam identity may also be explicitly signaled, or may be derived from other parameters such as configuration of the mobility reference signals. Upon receiving the handover command, the UE 102 will search for a beam with both correct cell identity and correct beam identify. It will then make a random access using the random access configuration provided in the handover command. This has the benefit of allowing network to provide a dedicated handover configuration for the UE 102, and explicitly assigning the UE 102 to a particular beam, but requires additional configuration and signaling and may result in the UE 102 ending up in a non-optimal beam.

In alternative 5, the UE 102 receives a handover command which contains a target cell identity, a random access configuration, a list of allowed beams and a mapping of a random preamble (or some other part of access configuration) to each beam identifier. The target cell identify may be explicitly signaled, or may be derived from other parameters, such as configuration of mobility reference signals. The list of beams may also be explicitly signaled, or may be derived from other parameters such as configuration of the mobility reference signals.

Upon receiving the handover command, the UE 102 will select a beam with both correct cell identity and an allowed beam identify. It will then make a random access using the random access configuration provided in the handover command, and set the random access preamble value to the value corresponding to the selected beam identifier. This has the benefit of allowing network to provide a dedicated handover configuration for the UE 102, limiting the number of possible beams the UE 102 may end it and allowing network to immediately detect which beam the UE 102 has selected, but again requires additional configuration and signaling. The UE 102 may also end up in a non-optimal beam.

The high level baseline procedure may be adopted as the working assumption for NR. Different alternatives for the hand-over execution may be studied.

The NR HO procedure challenges are also described herein. In a beam-based system like NR, and especially in higher frequency bands, the serving radio link to the UE 102 may become impaired much more rapidly than in conventional LTE deployments. As the UE 102 is moving out of the current serving beam coverage area, it may not be possible to conduct RRC signaling via the serving node to complete the HO procedure. It should be noted that in some NR deployments and scenarios, the probability of HO failure could increase due to the dependency on the RRC signaling transmissions over the source node at a time when the UE 102 has already moved into the coverage area of the target cell.

An early HO command may be used to improve HO robustness. To avoid the undesired dependence on the serving radio link upon the time (and radio conditions) where the UE 102 should execute the handover, NR should offer the possibility to provide that RRC signaling to the UE 102 earlier. To achieve this, it should be possible to associate the HO command with a condition. As soon as the condition is fulfilled, the UE 102 may execute the handover in accordance with the provided handover command.

In summary, NR should offer the possibility to associate the HO command (e.g., RRCConnectionReconfiguration with mobilityControlInfo) with a condition. As soon as the UE 102 determines the condition to be fulfilled, it may execute the handover in accordance with the handover command.

Such a condition could, for example, be that the quality of the mobility RS (MRS) of the target cell or beam becomes X dB stronger than the mobility RS (MRS) of the serving cell. The threshold used in a preceding measurement reporting event should then be chosen lower than the one in the handover execution condition. This allows the serving cell to prepare the handover upon reception of an early measurement report and to provide the RRCConnectionReconfiguration with mobilityControlInfo at a time when the radio link to the UE 102 is still stable. The execution of the handover is done at a later point in time (and threshold) that is considered optimal for the handover execution.

An example of a conditional handover execution based on DL RS measurements with just a serving and a target gNB is described in connection with FIG. 4. In practice there may often be many cells or beams that the UE 102 reported as possible candidates based on its preceding RRM measurements. The radio access network (RAN) should then have the freedom to issue conditional handover for several of those candidate.

The RRCConnectionReconfiguration for each of those candidates may differ, for example, in terms of the HO execution condition (e.g., RS to measure and threshold to exceed) as well as in terms of the RA preamble (denoted Uplink Signature Signal in FIG. 4) to be sent when a condition is met. It may, for example, increase the HO success rate if the UE 102 indicates by means of different RA preambles, which of the candidate target beams it selected (i.e., which beam fulfilled the HO execution condition).

This basic structure may be combined with other HO-enhancements. For example, the RRCConnectionReconfiguration for the early HO command could, for instance, also comprise a configuration for sending UL reference signals (similar to RA preambles) that both the serving as well as the neighbor nodes attempt to receive. The network could determine the most suitable cell based on the observed uplink signals and issue a downlink reference signal upon which the UE 102 executes the pre-conditioned HO command.

A UE 102 aiming to support URLLC with extremely short HO interruption requirements could be configured to maintain the data exchange with the source node while establishing the data exchange with the target. As was discussed with the LTE mobility enhancement, this may require additional Hardware Elements in the UE 102 and may, therefore, likely not be supported by all UEs 102.

To summarize, LTE handover involves RRC signaling over degrading radio links (from the source cell to the UE 102) which may cause undesired latency and high failure probability. In some NR deployments and scenarios, the probability of HO failure could increase due to the dependency on the RRC signaling transmissions over the source node at a time when the UE 102 has already moved into the coverage area of the target cell.

Based on these observations, the following may be implemented. The baseline procedure in FIG. 3 may be adopted as the NR handover procedure. Different alternatives may be studied for the hand-over execution. NR may offer the possibility to associate the HO command (RRCConnectionReconfiguration with mobilityControlInfo) with a condition. As soon as the UE 102 determines the condition to be fulfilled, it may execute the handover in accordance with the handover command.

DL-based mobility in RRC_CONNECTED mode (optimized for data transmission, at least for network-controlled mobility) mobility with RRC involvement, concerning beams and the relation to the NR cell definition may have the following features. The UE 102 at least measures one or more individual beams and gNB 160 should have mechanisms to consider those beams to perform HO. It should be noted that this may be necessary to trigger inter-gNB handovers and to optimize HO ping-pongs/HO failures. The UE 102 should be able to distinguish between the beams from its serving cell and beams from non-serving cells for RRM measurements in active mobility. The UE 102 should be able to determine if a beam is from its serving cell. In connected mode, intra-cell mobility can be handled by mobility without RRC involvement. The UE 102 should be able to identify a beam. These features may be developed to provide actions that have to be taken with respect to user plane entities at inter-cell handover.

Inter-cell mobility associated the MAC is described herein. As described above, intra-cell mobility should be able to be handled without RRC involvement. Beam management should be able to handle mobility across large areas (e.g., 10s or 100s of TRPs). However, for this to be possible, the TRPs deployed in one cell will have to meet certain conditions. For example, the following conditions may be met. TRPs need to be in DL sync. This can be achieved by using GPS at the gNB 160, for example. The signals from these TRPs should arrive at the UE 102 within the cyclic prefix. This can be achieved, for example, if the TRP coverage is relatively small (i.e., radio interface propagation delays between UE 102 and the different TRPs is relatively similar). It should be noted that this may often be the case in high frequency deployments.

Apart from these L1 limitations, there may also be higher layer limitations. The first question to address is whether all TRPs in the cell have to be handled by one and the same MAC entity in the network side, or whether these TRPs could be handled by multiple MAC entities (e.g. TRP1 by MAC1, TRP2 by MAC2).

If different beams in the cell would belong to different MAC entities, it means that not all beams cell areas are equal. In other words, the network may be able to very quickly switch between beams belonging to one MAC entity without any MAC impact (e.g., no HARQ flushing). However switching between beams belonging to different MAC entities might be slower (e.g., MAC cmd) and might have more impacts (e.g., HARQ flushing). If not all beams in the cell are equal, the question will arise whether the UE 102 when triggering/reporting RRC measurement reports should be aware of which beams of a cell belong to the same MAC (e.g., for cell quality determination).

In order to avoid this complexity, the impacts to higher layers during beam management should be minimized. In other words, when there are impacts to higher layers, the RRC may become involved to reconfigure/reset/re-establish the appropriate layers. As a consequence, beam management may be limited to operate amongst TRPs belonging to the same MAC. As a result, on the network side there will only be one MAC entity per cell.

To summarize, on the network side, there may only be one MAC entity per cell (i.e., all TRPs belonging to the same cell operate (e.g. are scheduled) by one and the same MAC entity). At inter-cell mobility, the MAC entity may be reset.

Inter-cell mobility with respect to RLC & PDCP is described herein. In LTE, for simplicity reasons, at every handover RLC and PDCP are re-established. Whether this is really necessary depends on the actual deployment of the user plane entities. Eight deployment options have been identified with additional sub-options. Table 2 looks at the user plane (UP) actions that would need to take place when the UE 102 moves from cell-1 to cell-2 in the different deployments.

TABLE 2

| | MAC | RLC | PDCP | Considerations |
|---|---|---|---|---|
| 1. Inter-gNB mobility | Reset | Re-establish | Re-establish | Full handover |
| 2. RLC in DU | Reset | Re-establish | | If PDCP is always handling out of sequence data, no PDCP re-establishment may be needed in this case |
| 3. Split RLC | Reset | | | |
| 4. CPRI | | | | Whether this case often result in inter-cell mobility |

As can be seen, a large part of the UP reset/re-establishment functionality is actually not needed at each inter-cell handover. Due to the higher data rates, usage of a fronthaul in NR deployments will significantly increase compared to LTE. This will also decrease the necessity of a full UP reset/re-establishment at every handover. Therefore, at inter-cell mobility, RLC/PDCP re-establishment may not always need to be executed. The required flexibility with respect to re-establishing/not re-establishing RLC & PDCP entities may be further studied.

The following approaches may be used for NR mobility in CONNECT-ACTIVE. In a first approach, on the network side, there is only one MAC entity per cell. In other words, all TRPs belonging to the same cell operate (e.g., are scheduled) by one and the same MAC entity. In a second approach, at inter-cell mobility, the MAC entity will always need to be reset. In a third approach, at inter-cell mobility, RLC/PDCP re-establishment may not always need to be executed.

RRC procedures for network based and UE 102 based mobility are also described. A mobility procedure can be broken into the following fundamental steps: (1) Mobility trigger, i.e., when to perform the mobility procedure; (2) target link establishment; and (3) mobility completion. Further details regarding RRC and Xn procedures for establishment of the target link are provided.

Target link establishment includes Xn context transfer of the UE 102 state between the source and target gNB 160 involved in the mobility procedure and configuration of UE 102 resources via RRC. Reusing the terminology in LTE, for handover (HO), context is transferred before the UE 102 connects. For context fetch, context is transferred after the UE 102 connects With regards to RRC based mobility, two levels of network controlled mobility include (1) RRC driven at "cell" level; and (2) zero/minimum RRC involvement (e.g. at MAC/PHY).

For network controlled mobility, the network may determine when the HO occurs and as such it makes sense to reuse the same principles as LTE for the target link establishment procedures. To summarize, network controlled mobility can reuse the LTE HO procedures to transfer the UE 102 context to the target gNB 160.

In addition, for the UE 102 in the "new state", the RAN should be aware whenever the UE 102 moves from one "RAN-based notification area" to another. For reselection, the UE 102 will always connect to the target gNB 160 before the context is transferred since the UE 102 is making the decision on which target RAN node. To summarize, the new RRC state may require a context fetch procedure to transfer the UE context to the new RAN area when the UE 102 informs the RAN of the reselection. In an approach, NR may support HO and context fetch as part of the NR mobility procedures.

Figure 5:
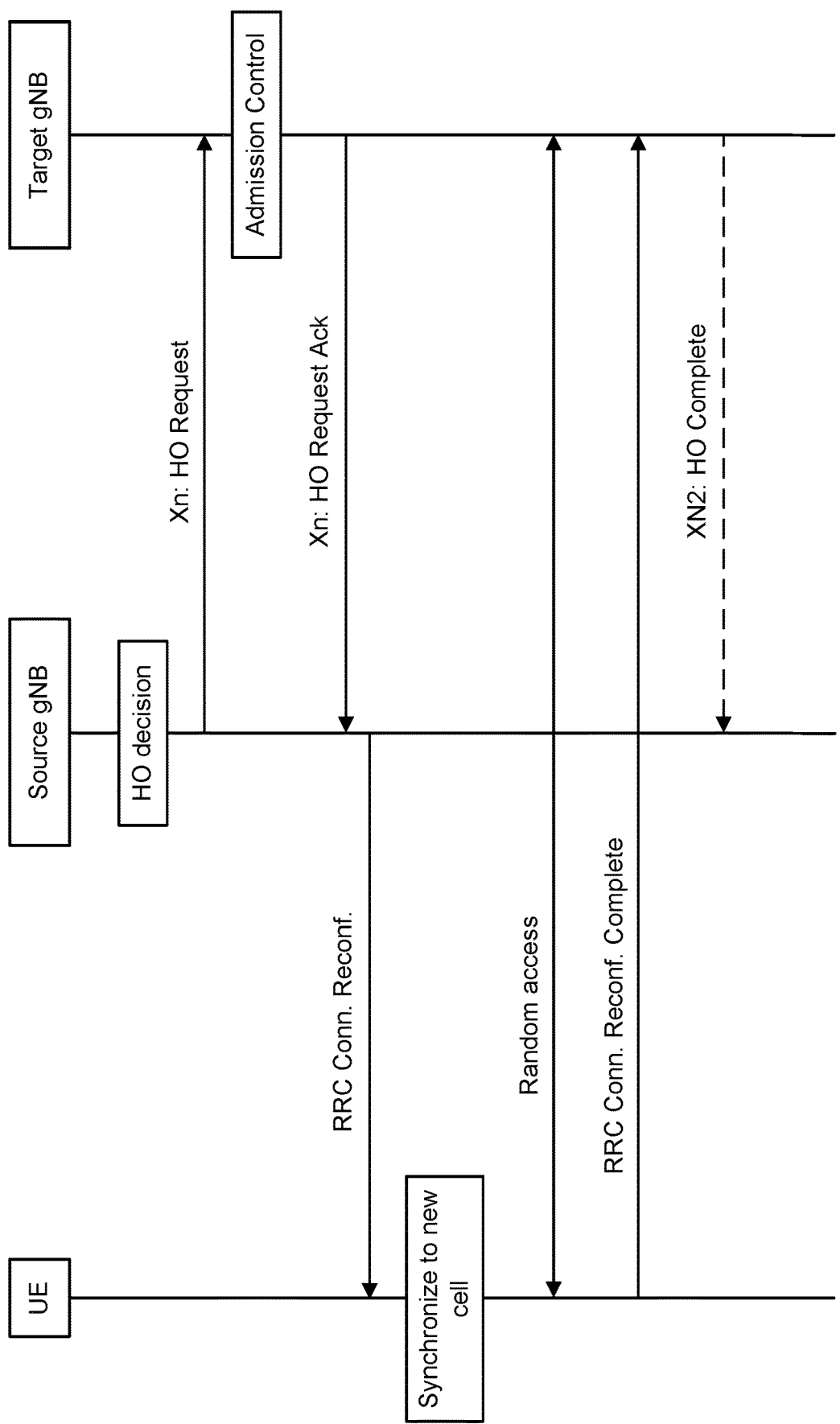
FIG. 5 is a call flow diagram illustrating a HO procedure to establish a link at the target gNB after a mobility trigger has occurred.

Procedures for HO are provided herein. As discussed above, network-based mobility implies the network determines when to perform the HO to the target gNB 160. FIG. 5 shows a call flow HO procedure to establish a link at the target gNB 160 after the mobility trigger has occurred at the source gNB 160 based on measurements. In another approach, network-based mobility may reuse the same principles as LTE for HO consisting of one or more of the following: (1) the source gNB 160 initiates the HO over the Xn interface (.g., via a HO request); (2) the target gNB 160 performs admission control and provides the RRC configuration as part of the HO acknowledgement; (3) the source gNB 160 provides the configuration to the UE 102 including the HO command equivalent via RRC; and (4) the UE 102 establishes a connection at the target gNB 160 via RRC.

Figure 6:
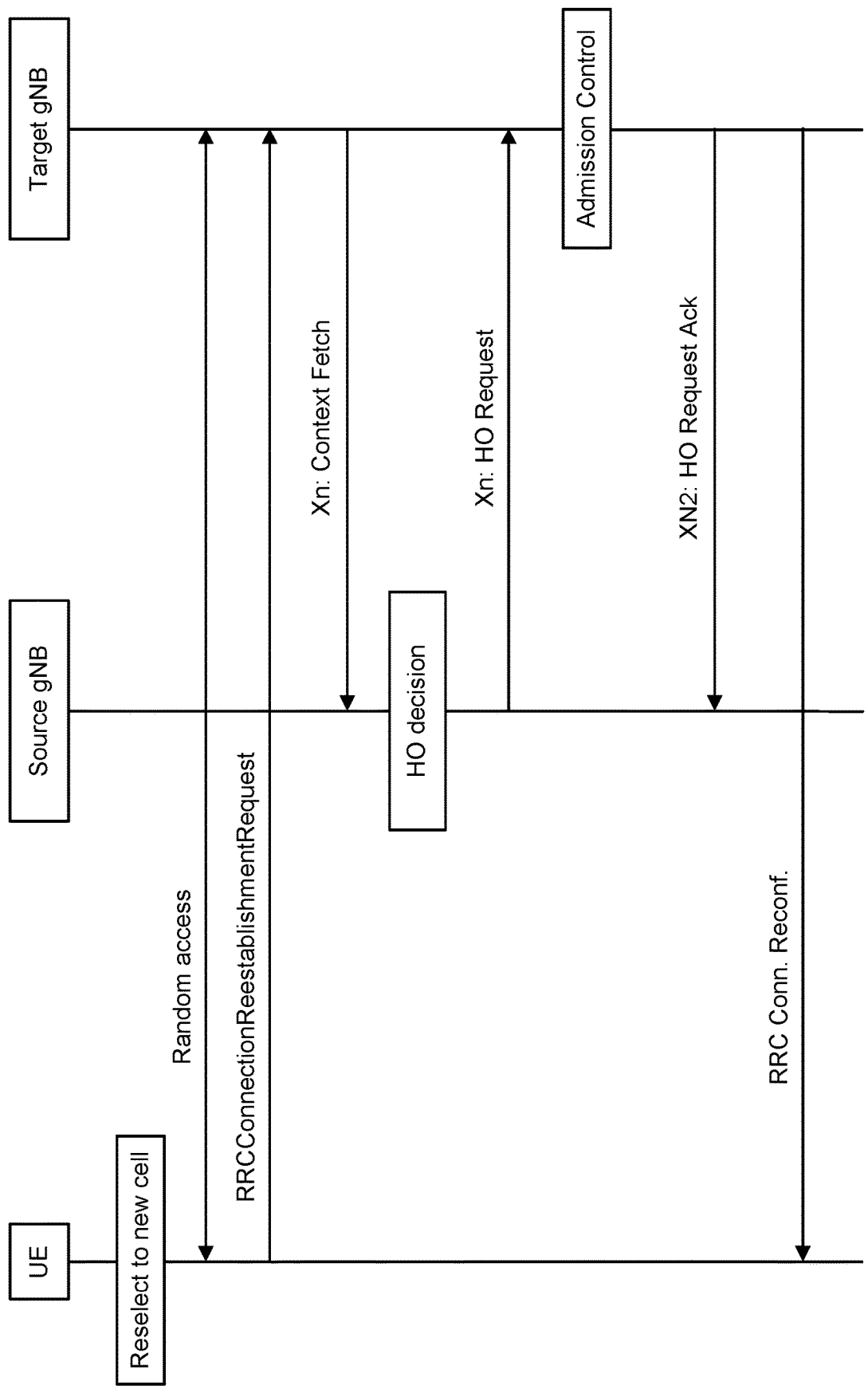
FIG. 6 is a call flow diagram illustrating a context fetch procedure to establish a link at the target gNB after the mobility trigger has occurred.

Procedures for context fetch are provided herein. As discussed above, UE-based mobility, or reselection, implies the UE 102 determines when to reselect to the target gNB 160. FIG. 6 shows a call flow for the context fetch procedure to establish a link at the target gNB 160 after the mobility trigger has occurred at the UE 102 based on reselection or selection after RLF.

In yet another approach, UE-based mobility may reuse the same principles as LTE for context fetch consisting of one or more of the following: (1) the UE 102 establishes a connection at the target gNB via RRC; (2) the target gNB 160 indicates to the source gNB 160 that the UE 102 has established a connection; (3) the target gNB 160 and source gNB 160 transfer the UE context via Xn; and (4) the target gNB 160 reconfigures the UE 102 via RRC.

Regarding intra NR, NR may support UE reselection in which the UE 102 determines a mobility event based on measurements of attributes of the serving and neighbor cells (both intra radio access technology (RAT) and inter RAT). The NR may support handover in which the RAN determines a mobility event based on measurements of the serving and neighbor cells (both intra RAT and inter RAT). The NR may support HO and context fetch as part of the NR mobility procedures. The NR may reuse similar mechanisms as LTE for forwarding data, updating u-plane path and resource release as part of the mobility procedures.

Figure 7:
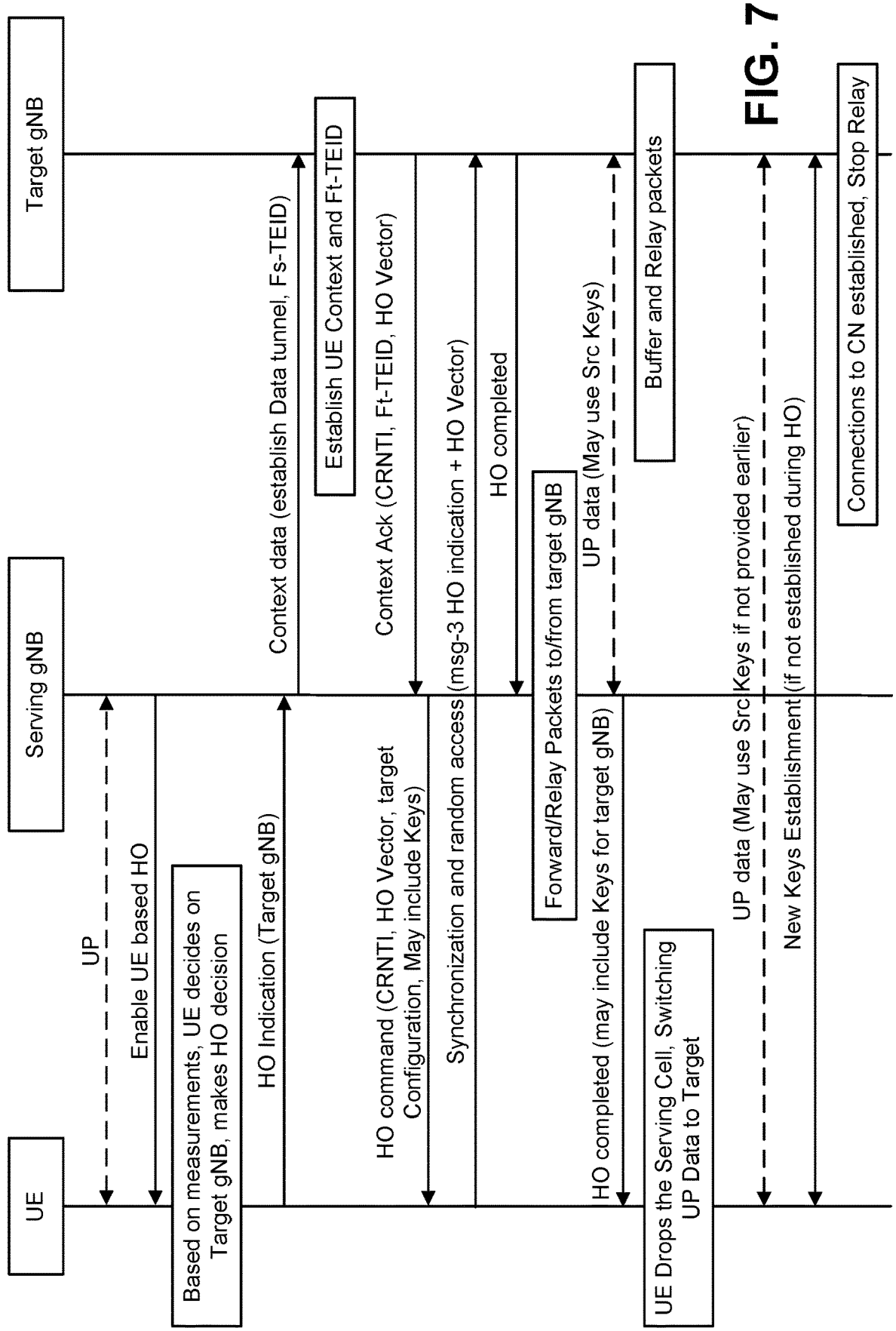
FIG. 7 is a call flow diagram illustrating an expedited UE-based HO PUSH procedure for NR.
Figure 8:
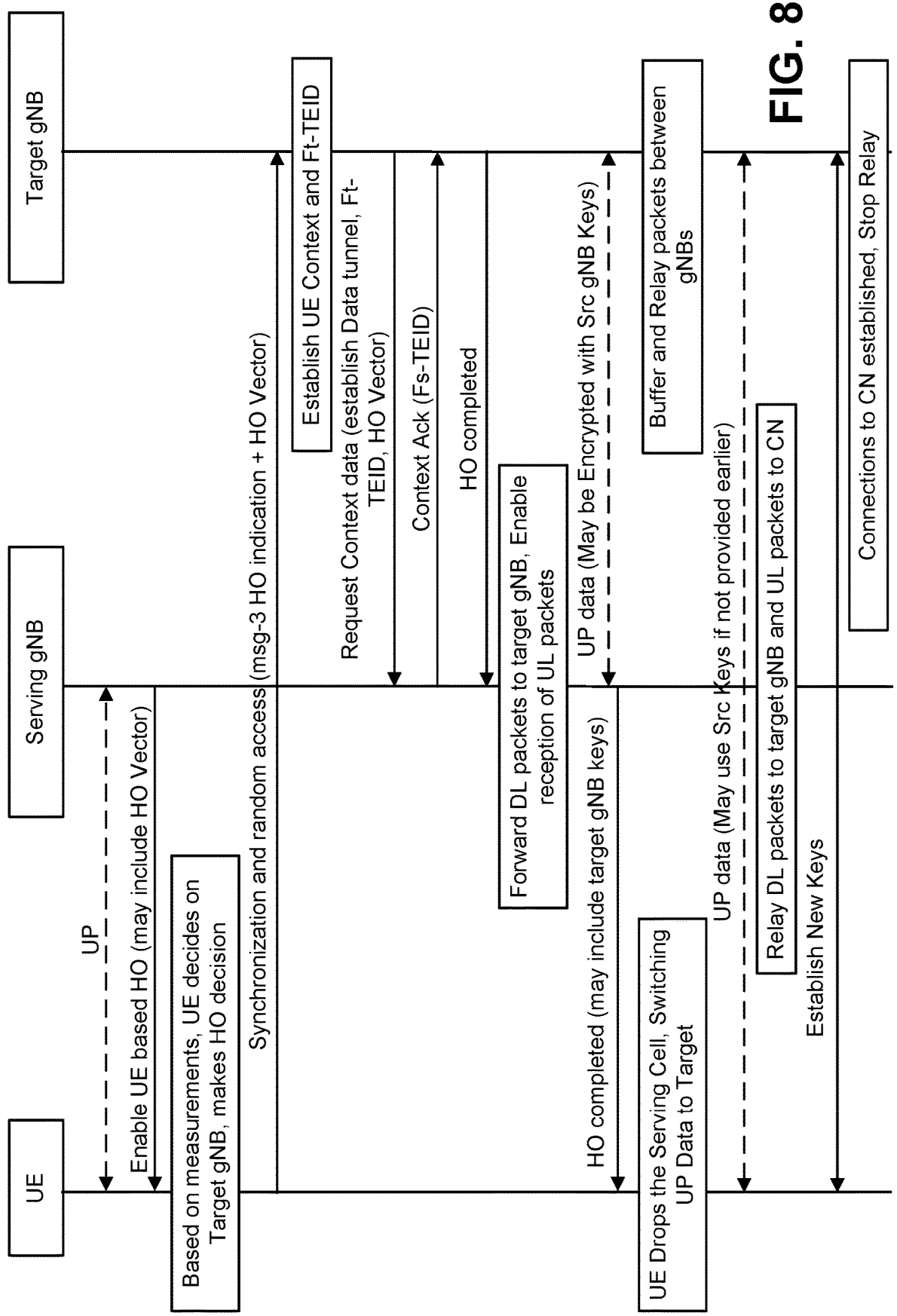
FIG. 8 is a call flow diagram illustrating an expedited UE-based HO PULL procedure for NR.

Two expedited UE-based HO procedures for NR are described in connection with FIG. 7 and FIG. 8. FIG. 7 depicts a UE-based HO PUSH procedure for NR. FIG. 8 depicts a UE-based HO PULL procedure for NR.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more physical antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more physical antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB handoff module 194. The gNB handoff module 194 may perform handoff operations as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2A:
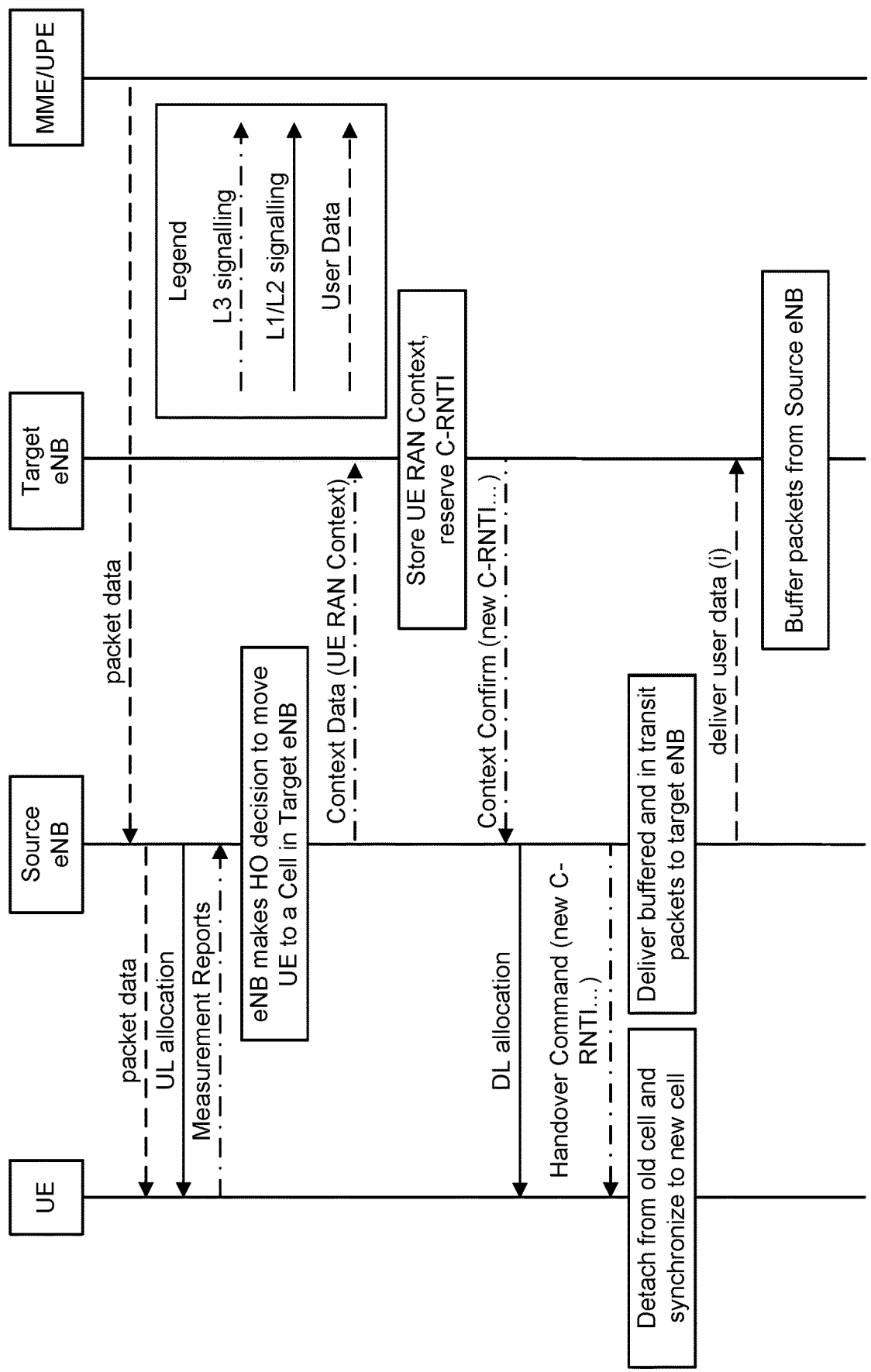
FIGS. 2A and 2B are a call flow diagram illustrating active mode mobility in LTE.
Figure 2B:
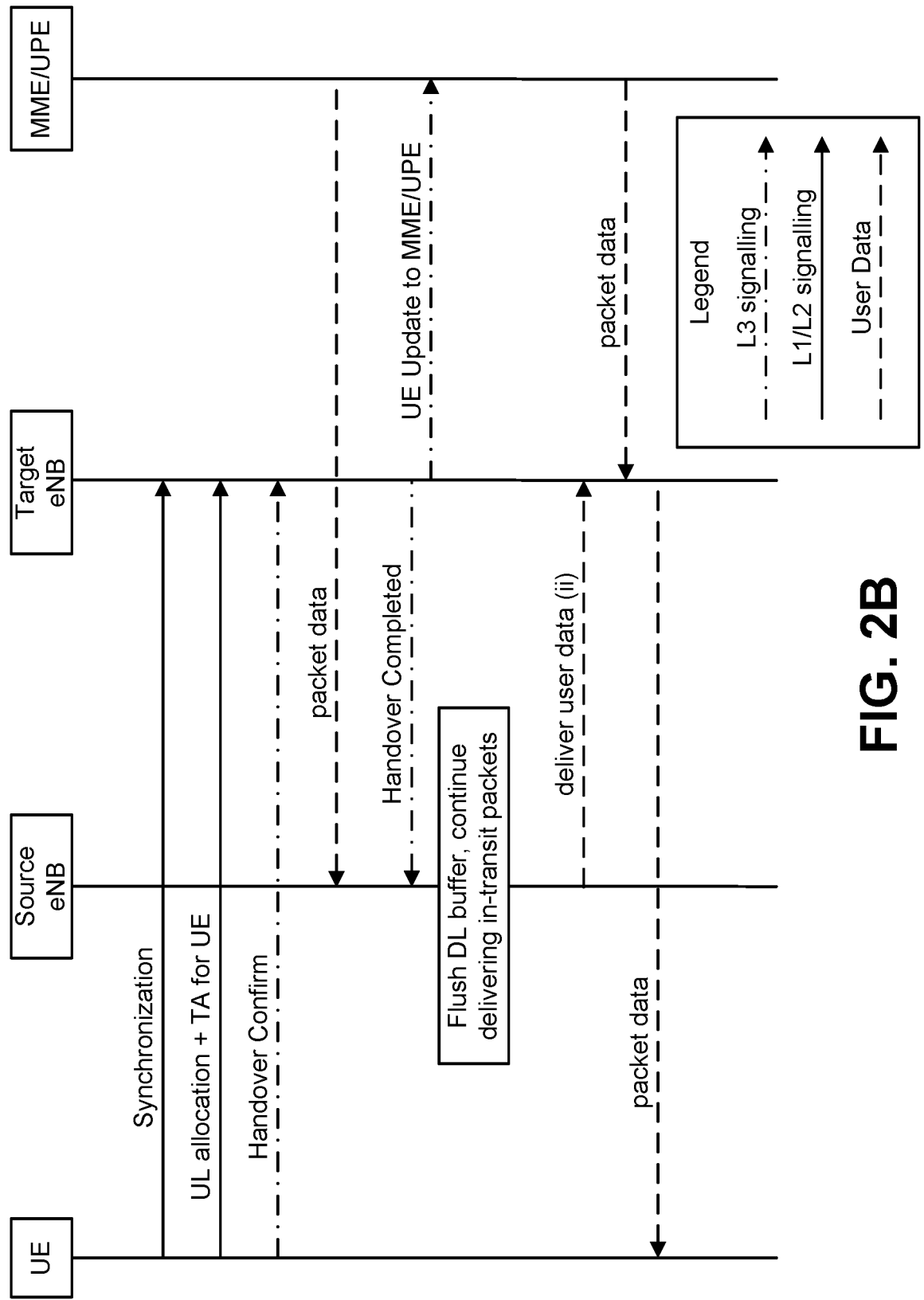

FIGS. 2A and 2B are a call flow diagram illustrating active mode mobility in LTE. In particular, the HO procedure used in LTE is depicted in FIG. 1.

FIG. 3 is a call flow diagram illustrating a baseline HO procedure for NR.

Figure 4:
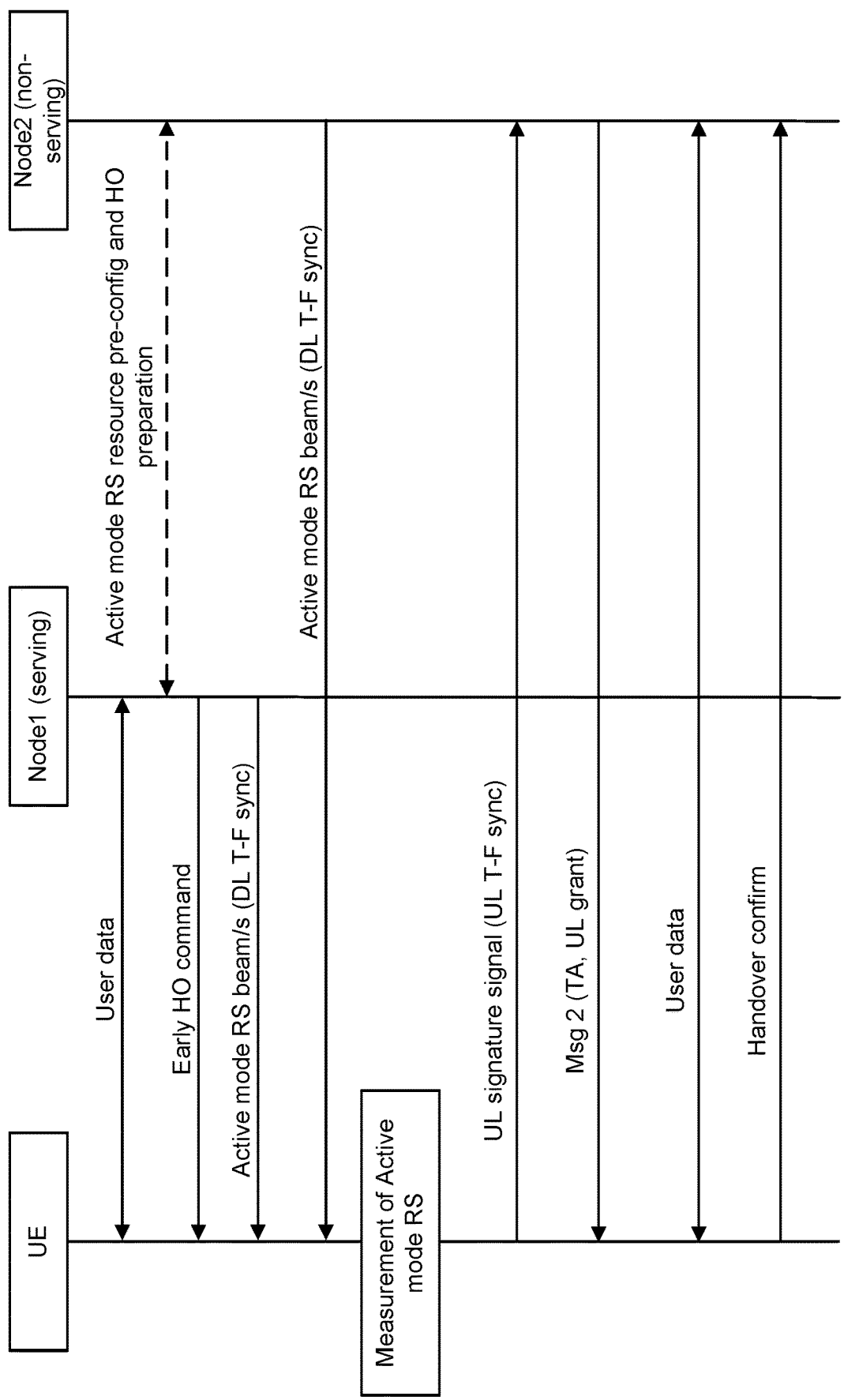
FIG. 4 is a call flow diagram illustrating conditional handover execution based on downlink (DL) reference signal (RS) measurements.

FIG. 4 is a call flow diagram illustrating conditional handover execution based on DL RS measurements.

FIG. 5 is a call flow diagram illustrating a HO procedure to establish a link at the target gNB after a mobility trigger has occurred. The source gNB may make the HO decision (i.e., mobility trigger) based on measurements. The source gNB may send an HO request to the target gNB on the Xn interface.

The target gNB may perform admission control. The target gNB may send an HO request acknowledgement (Ack) to the source gNB over the Xn interface. The target gNB may provide the RRC configuration as part of the HO acknowledgement The source gNB may send an RRC connection reconfiguration to the UE. The source gNB provides the configuration to the UE including the HO command equivalent via RR.

The UE may synchronize to the new cell. The UE may perform random access with the target gNB. The UE may send an RRC connection reconfiguration complete to the target gNB. The target gNB may send an HO complete message to the source gNB on the Xn2 interface.

FIG. 6 is a call flow diagram illustrating a context fetch procedure to establish a link at the target gNB after the mobility trigger has occurred. The mobility trigger may occur at the UE based on reselection or selection after RLF. The UE may determine to reselect to the new cell.

The UE may establish a connection at the target gNB via RRC. The UE may perform a random access with the target gNB. The UE may send an RRC connection reestablishment request to the target gNB.

The target gNB may indicate to the source gNB that the UE has established a connection. The target gNB and source gNB may transfer the UE context via Xn. For example, the target gNB may send a context fetch to the source gNB on the Xn interface.

The source gNB may perform an HO decision. The source gNB may send an HO request to the target gNB on the Xn interface. The target gNB may perform admission control. The target gNB may send an HO request acknowledgement (Ack) to the source gNB over the Xn interface.

The target gNB reconfigures the UE via RRC. For example, the target gNB may send an RRC connection reconfiguration to the UE.

FIG. 7 is a call flow diagram illustrating an expedited UE-based HO PUSH procedure for NR. In the PUSH mechanism, the UE informs the Serving (source) gNB of its decision to handoff to the target gNB. The Source gNB then pushes the UE contexts to the target gNB and establishes the Data Forwarding tunnel (i.e., Providing its Tunnel End Identification Fs-TEID).

The Target gNB responds with an Acknowledgment which may include typical information that facilitates UE access similar to LTE. The Ack message will also include Data Forwarding Tunnel ID at the target gNB (Ft-TEID), and the Security HO-Vector that is used to validate the UE at the target cell. Now the Forwarding Data Tunnel is established and the UE is ready for handoff.

The HO command is then used to trigger UE to access the target cell (by sending HO command which includes the necessary IEs). The target cell may indicate to the source cell that UE is present and ready by sending HO complete message.

The Source gNB may start forwarding User Plane (UP) data to the target gNB at this time. A handoff complete message is sent to the UE to indicate that data is ready for transfer. The HO complete may come from the Serving gNB or from the Target gNB.

The UP data forwarded by the Source gNB may be encrypted using Source gNB Keys, and the target gNB would act as a relay node in this case. The UE then drops the source cell and starts transmitting and receiving data from target gNB.

Meanwhile the target gNB would perform network connection and switches data path with the core network. New data keys are established with the UE if not established during the HO preparation (i.e., HO command).

FIG. 8 is a call flow diagram illustrating an expedited UE-based HO PULL procedure for NR. In the PULL mechanism, the UE that is enabled to use UE-based HO and is equipped with HO-vector, makes a decision to transfer to the target gNB.

The UE synchronizes and establishes an RRC connection with the target gNB with an HO-Indication. The UE provides its ID, source gNB Identification, and HO vector during this procedure.

The target gNB PULLS UE contexts and establishes Data Forwarding Tunnel by providing its Ft-TEID to the source gNB. The source gNB compares the UE HO-Vectors (received and stored) and if matched establishes a forwarding tunnel and responds with Fs-TEID. The Target gNB concludes the HO preparation with a HO complete message to the source gNB. Now the Data tunnel is established and data forwarding starts.

Meanwhile the UE is informed either by the Source or the Target gNB. Now the UE can start receiving/sending data with the target gNB. The data may be encrypted using Source gNB keys. The Target gNB establishes the connection with the core network and updates the keys with the UE while data is forwarded through the Source gNB. Once the connection to the core network and data path is switched, the Forwarding data tunnel between the two gNBs is released.

Figure 9:
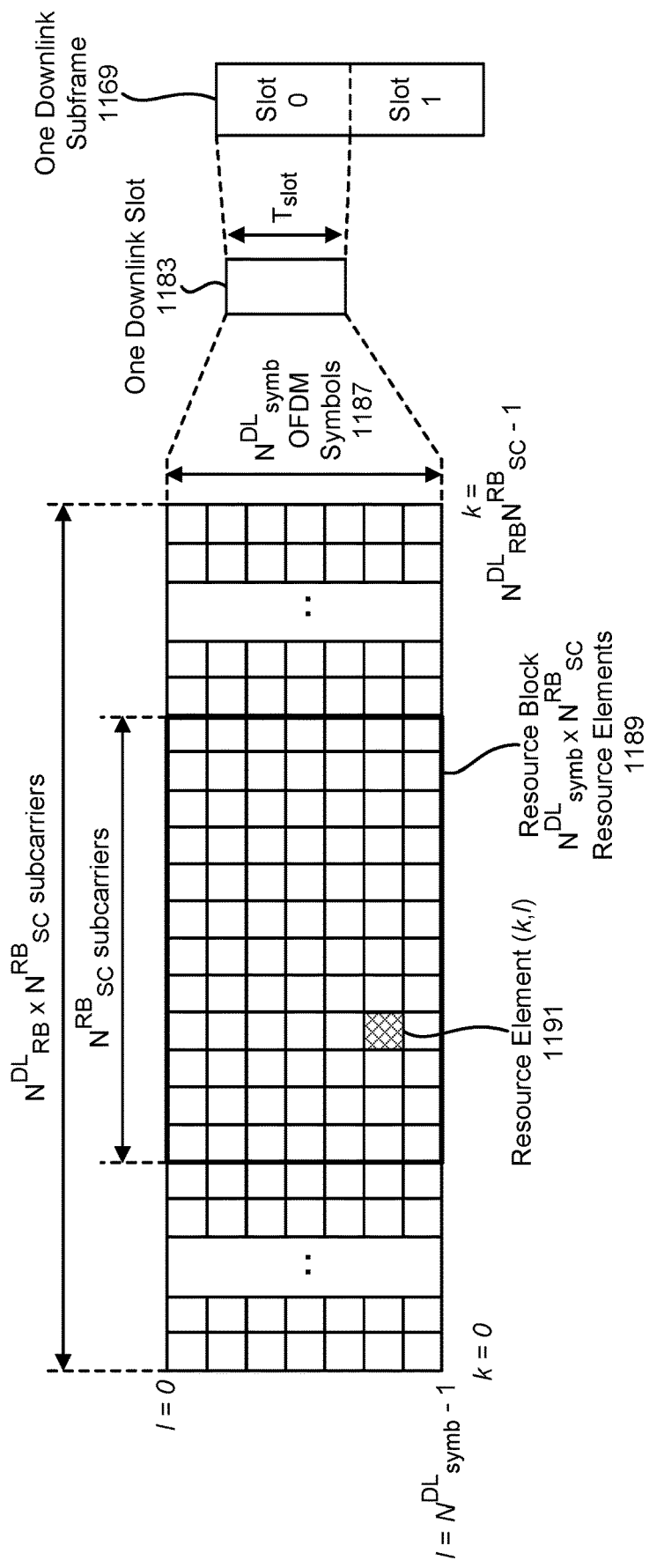
FIG. 9 is a diagram illustrating one example of a resource grid for the downlink.

FIG. 9 is a diagram illustrating one example of a resource grid for the downlink. The resource grid illustrated in FIG. 9 may be utilized in some implementations of the systems and methods disclosed herein. More detail regarding the resource grid is given in connection with FIG. 1.

In FIG. 9, one downlink subframe 1169 may include two downlink slots 1183. $N^{DL}_{RB}$ is downlink bandwidth configuration of the serving cell, expressed in multiples of $N^{RB}_{sc}$, where $N^{RB}_{sc}$ is a resource block 1189 size in the frequency domain expressed as a number of subcarriers, and $N^{DL}_{symb}$ is the number of OFDM symbols 1187 in a downlink slot 1183. A resource block 1189 may include a number of resource elements (RE) 1191.

For a PCell, $N^{DL}_{RB}$ is broadcast as a part of system information. For an SCell (including an LAA SCell), $N^{DL}_{RB}$ is configured by a RRC message dedicated to a UE 102. For PDSCH mapping, the available RE 1191 may be the RE 1191 whose index l fulfils l≥$l_{data,start}$ and/or $l_{data,end}$≥l in a subframe.

In the downlink, the OFDM access scheme with cyclic prefix (CP) may be employed, which may be also referred to as CP-OFDM. In the downlink, PDCCH, EPDCCH, PDSCH and the like may be transmitted. A downlink radio frame may consist of multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair consists of two downlink RBs that are continuous in the time domain.

The downlink RB consists of twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 10:
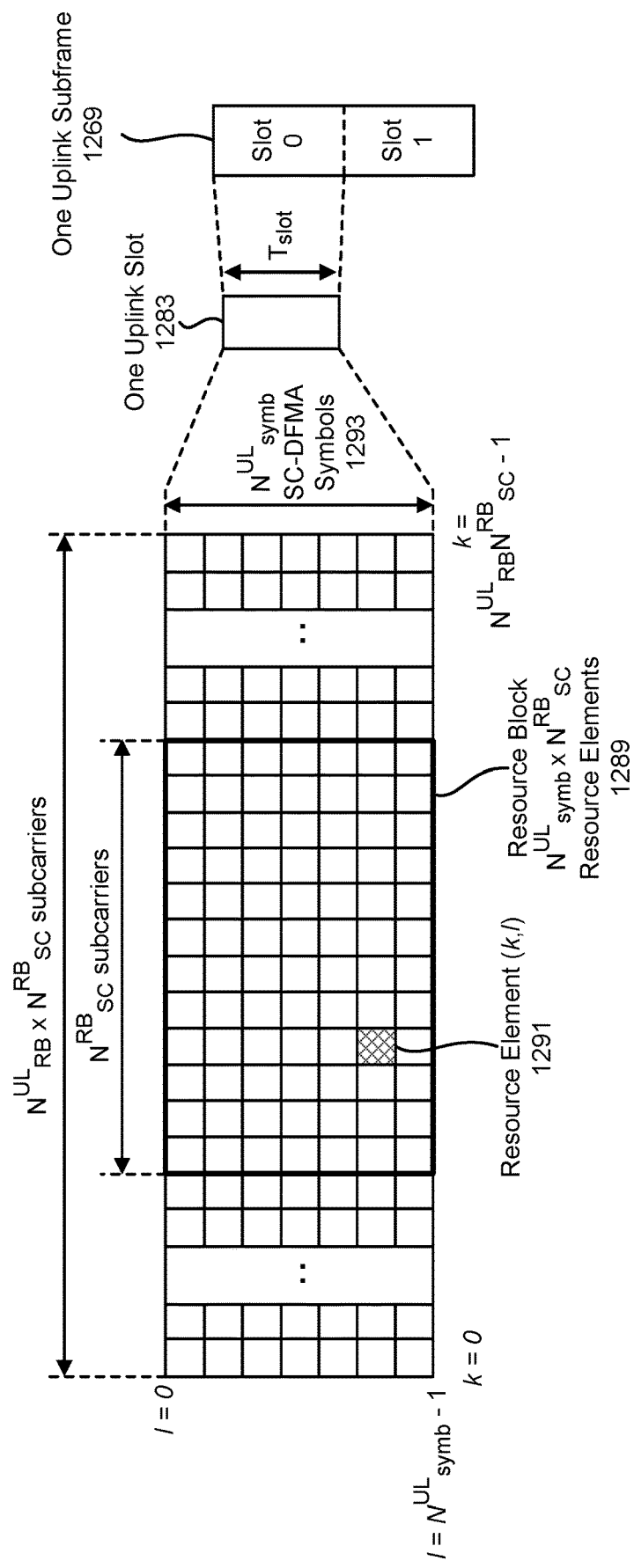
FIG. 10 is a diagram illustrating one example of a resource grid for the uplink.

FIG. 10 is a diagram illustrating one example of a resource grid for the uplink. The resource grid illustrated in FIG. 10 may be utilized in some implementations of the systems and methods disclosed herein. More detail regarding the resource grid is given in connection with FIG. 1.

In FIG. 10, one uplink subframe 1269 may include two uplink slots 1283. $N^{UL}_{RB}$ is uplink bandwidth configuration of the serving cell, expressed in multiples of $N^{RB}_{sc}$, where $N^{RB}_{sc}$ is a resource block 1289 size in the frequency domain expressed as a number of subcarriers, and $N^{UL}_{symb}$ is the number of SC-FDMA symbols 1293 in an uplink slot 1283. A resource block 1289 may include a number of resource elements (RE) 1291.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PDSCH, PRACH and the like may be transmitted. An uplink radio frame may consist of multiple pairs of uplink resource blocks. The uplink RB pair is a unit for assigning uplink radio resources, defined by a predetermined bandwidth (RB bandwidth) and a time slot. The uplink RB pair consists of two uplink RBs that are continuous in the time domain.

The uplink RB may consist of twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 11:
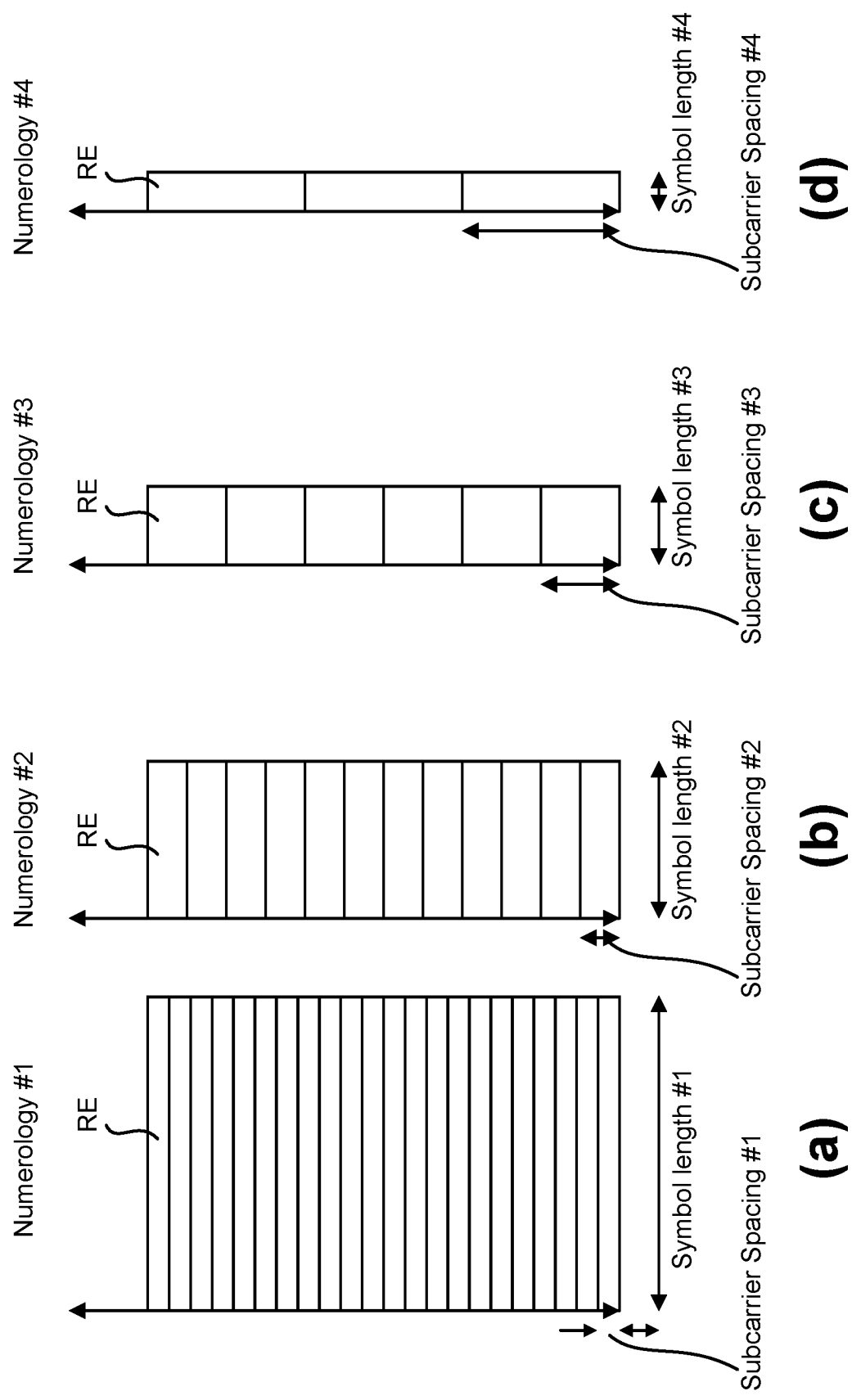
FIG. 11 shows examples of several numerologies.

FIG. 11 shows examples of several numerologies. The numerology #1 may be a basic numerology. For example, a RE of the basic numerology is defined with subcarrier spacing of 15 kHz in frequency domain and 2048 Ts+CP length (e.g. 160 Ts or 144 Ts) in time domain, where Ts denotes a baseband sampling time unit defined as 1/(15000*2048) seconds. For the i-th numerology, the sub-carrier spacing may be equal to 15*2i and the effective OFDM symbol length 2048*2−i*Ts. It may cause the symbol length is 2048*2−i*Ts+CP length (e.g. 160*2−i*Ts or 144*2−i*Ts). In other words, the subcarrier spacing of the i+1-th numerology is a double of the one for the i-th numerology, and the symbol length of the i+1-th numerology is a half of the one for the i-th numerology. FIG. 11 shows four numerologies, but the system may support another number of numerologies. Furthermore, the system does not have to support all of the 0-th to the I-th numerologies, i=0, 1, . . . , I.

Figure 12:
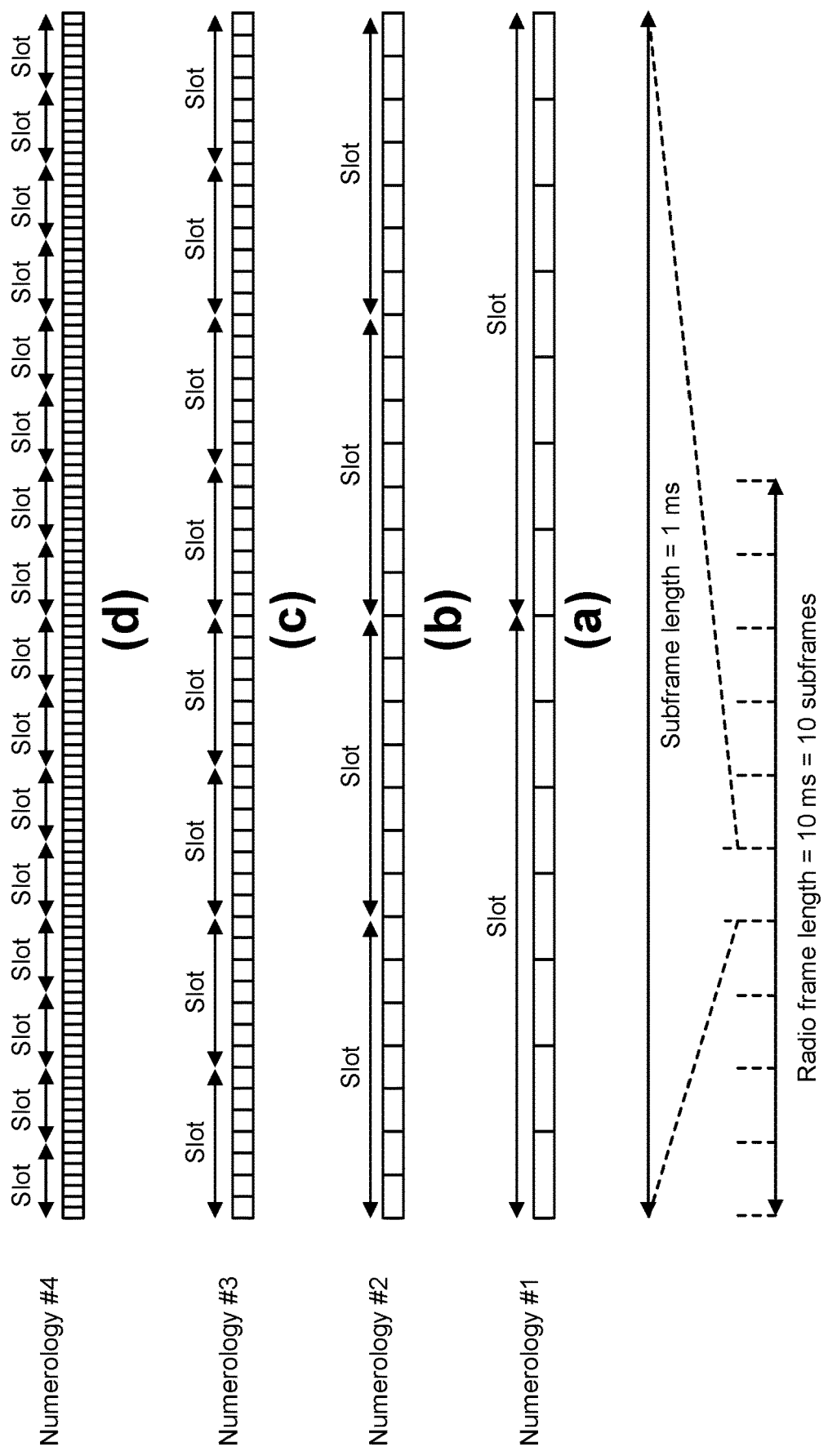
FIG. 12 shows examples of subframe structures for the numerologies that are shown in FIG. 11.

FIG. 12 shows examples of subframe structures for the numerologies that are shown in FIG. 11. Given that a slot consists of $N^{DL}_{symb}$ (or $N^{UL}_{symb}$)=7 symbols, the slot length of the i+1-th numerology is a half of the one for the i-th numerology, and eventually the number of slots in a subframe (i.e., 1 ms) becomes double. It may be noted that a radio frame may consists of 10 subframes, and the radio frame length may be equal to 10 ms.

Figure 13:
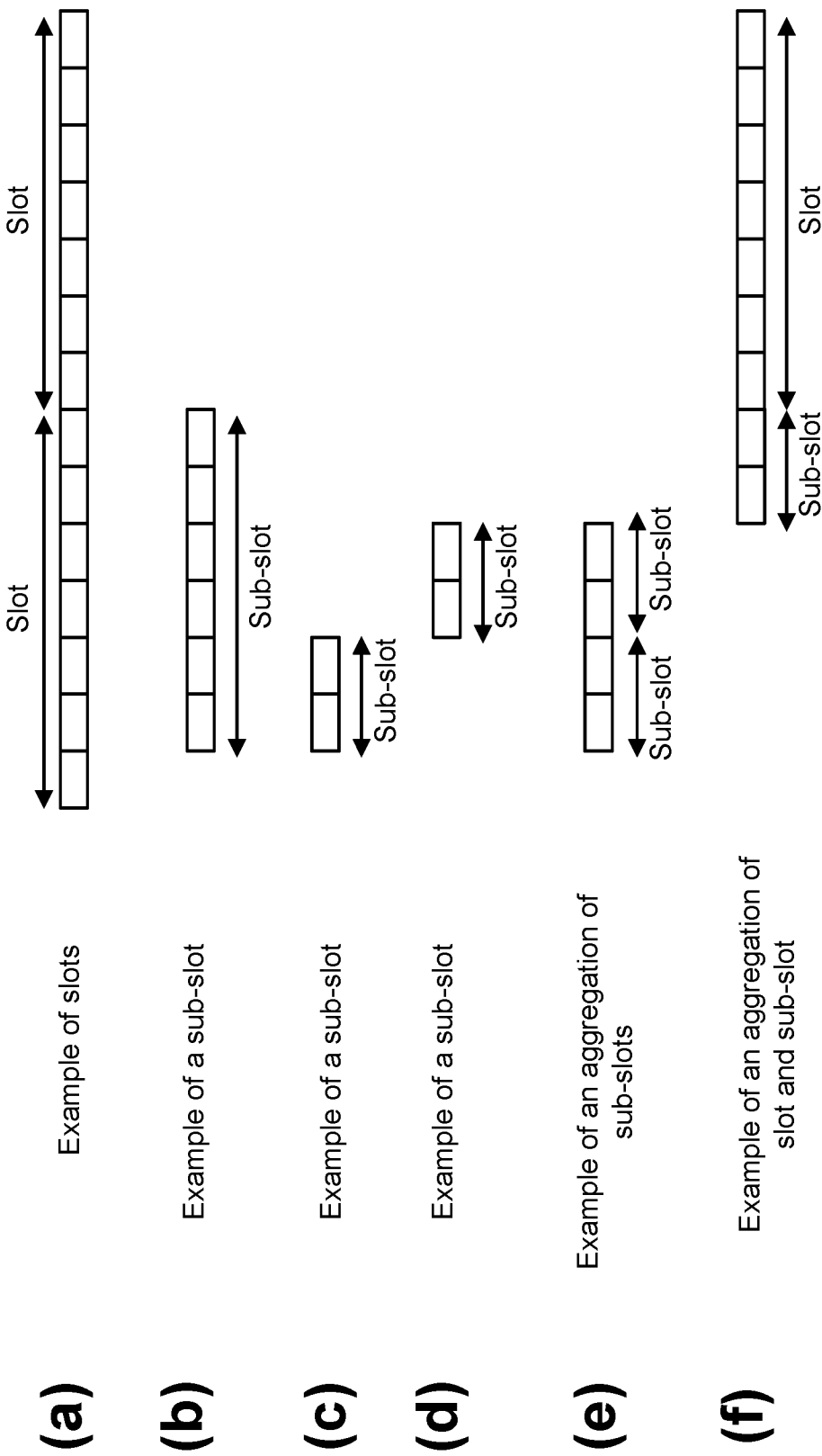
FIG. 13 shows examples of slots and sub-slots.

FIG. 13 shows examples of slots and sub-slots. If sub-slot is not configured by higher layer, the UE 102 and the eNB/gNB 160 may only use a slot as a scheduling unit. More specifically, a given transport block may be allocated to a slot. If the sub-slot is configured by higher layer, the UE 102 and the eNB/gNB 160 may use the sub-slot as well as the slot. The sub-slot may consist of one or more OFDM symbols. The maximum number of OFDM symbols that constitute the sub-slot may be $N^{DL}_{symb}-1$ (or $N^{UL}_{symb}-1$).

The sub-slot length may be configured by higher layer signaling. Alternatively, the sub-slot length may be indicated by a physical layer control channel (e.g. by DCI format).

The sub-slot may start at any symbol within a slot unless it collides with a control channel. There could be restrictions of mini-slot length based on restrictions on starting position. For example, the sub-slot with the length of $N^{DL}_{symb}-1$ (or $N^{UL}_{symb}-1$) may start at the second symbol in a slot. The starting position of a sub-slot may be indicated by a physical layer control channel (e.g. by DCI format). Alternatively, the starting position of a sub-slot may be derived from information (e.g. search space index, blind decoding candidate index, frequency and/or time resource indices, PRB index, a control channel element index, control channel element aggregation level, an antenna port index, etc.) of the physical layer control channel which schedules the data in the concerned sub-slot.

In cases when the sub-slot is configured, a given transport block may be allocated to either a slot, a sub-slot, aggregated sub-slots or aggregated sub-slot(s) and slot. This unit may also be a unit for HARQ-ACK bit generation.

Figure 14:
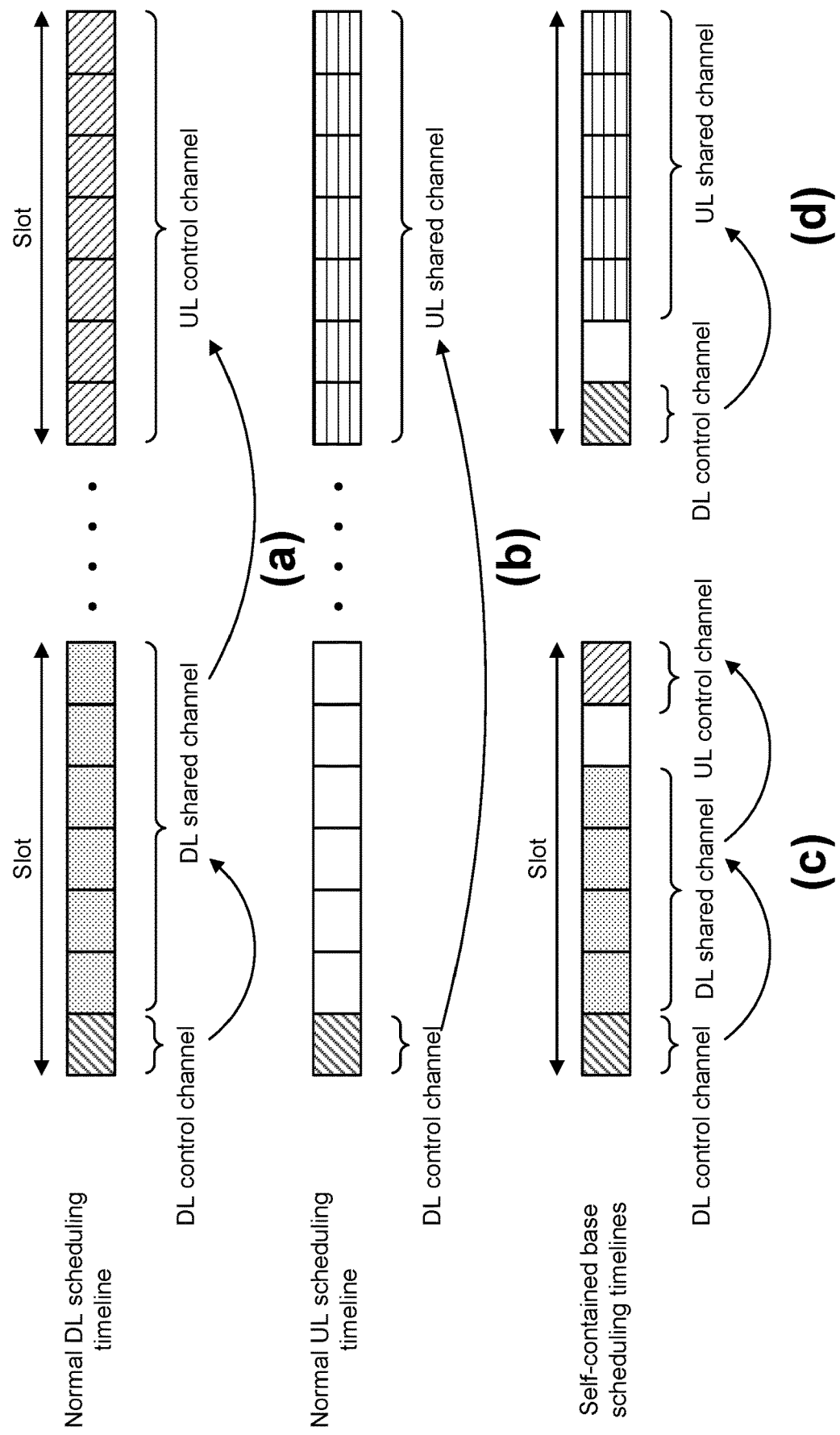
FIG. 14 shows examples of scheduling timelines.

FIG. 14 shows examples of scheduling timelines. For a normal DL scheduling timeline, DL control channels are mapped the initial part of a slot. The DL control channels schedule DL shared channels in the same slot. HARQ-ACKs for the DL shared channels (i.e. HARQ-ACKs each of which indicates whether or not transport block in each DL shared channel is detected successfully) are reported via UL control channels in a later slot. In this instance, a given slot may contain either one of DL transmission and UL transmission. For a normal UL scheduling timeline, DL control channels are mapped the initial part of a slot. The DL control channels schedule UL shared channels in a later slot. For these cases, the association timing (time shift) between the DL slot and the UL slot may be fixed or configured by higher layer signaling. Alternatively, it may be indicated by a physical layer control channel (e.g. the DL assignment DCI format, the UL grant DCI format, or another DCI format such as UE-common signaling DCI format which may be monitored in common search space).

For a self-contained base DL scheduling timeline, DL control channels are mapped to the initial part of a slot. The DL control channels schedule DL shared channels in the same slot. HARQ-ACKs for the DL shared channels are reported in UL control channels which are mapped at the ending part of the slot. For a self-contained base UL scheduling timeline, DL control channels are mapped to the initial part of a slot. The DL control channels schedule UL shared channels in the same slot. For these cases, the slot may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g. PDSCH, PUSCH, PUCCH, etc.).

FIG. 15 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include DM-RS) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 16:
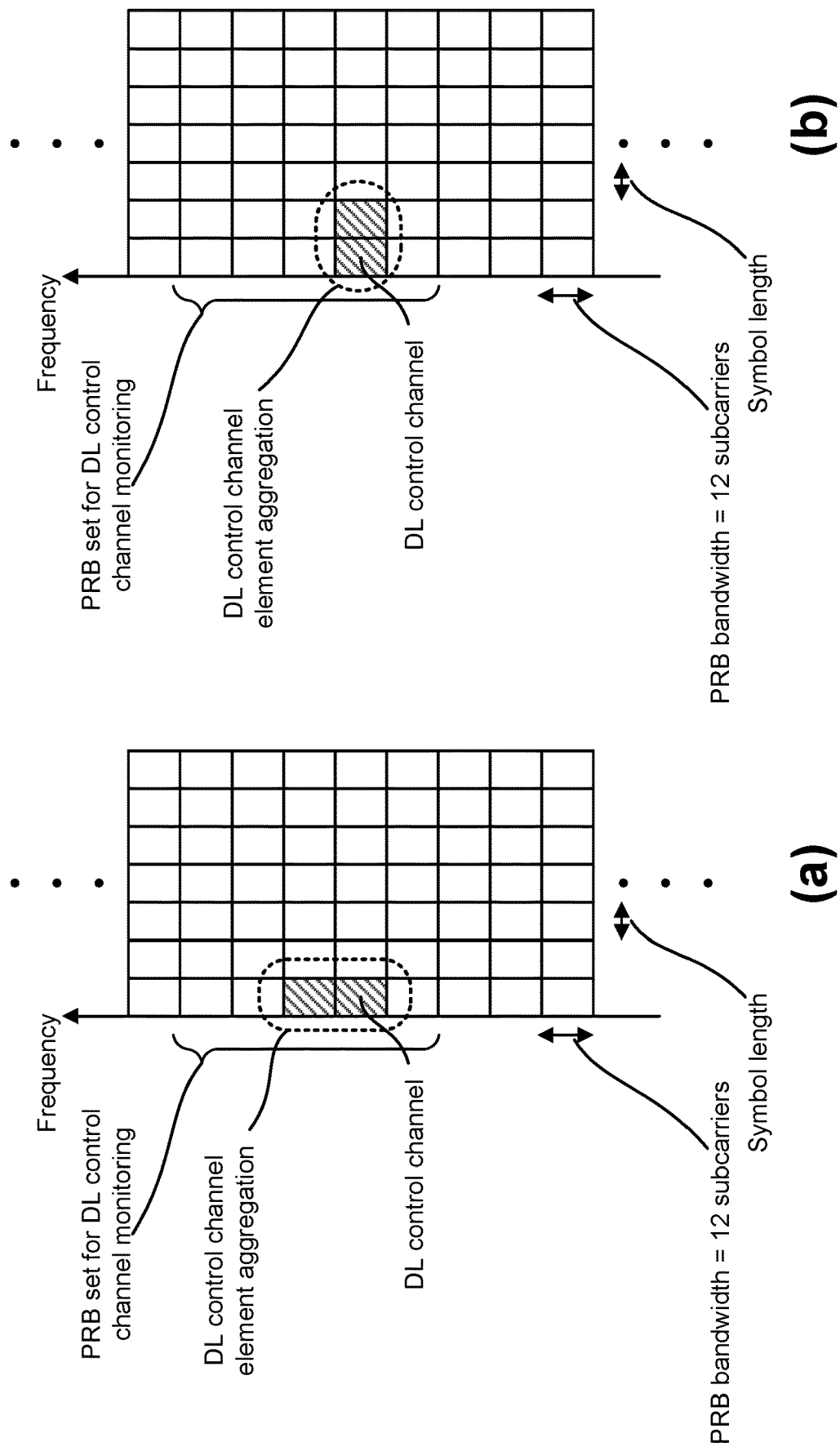
FIG. 16 shows examples of DL control channel which consists of more than one control channel elements.

FIG. 16 shows examples of DL control channel which consists of more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 17:
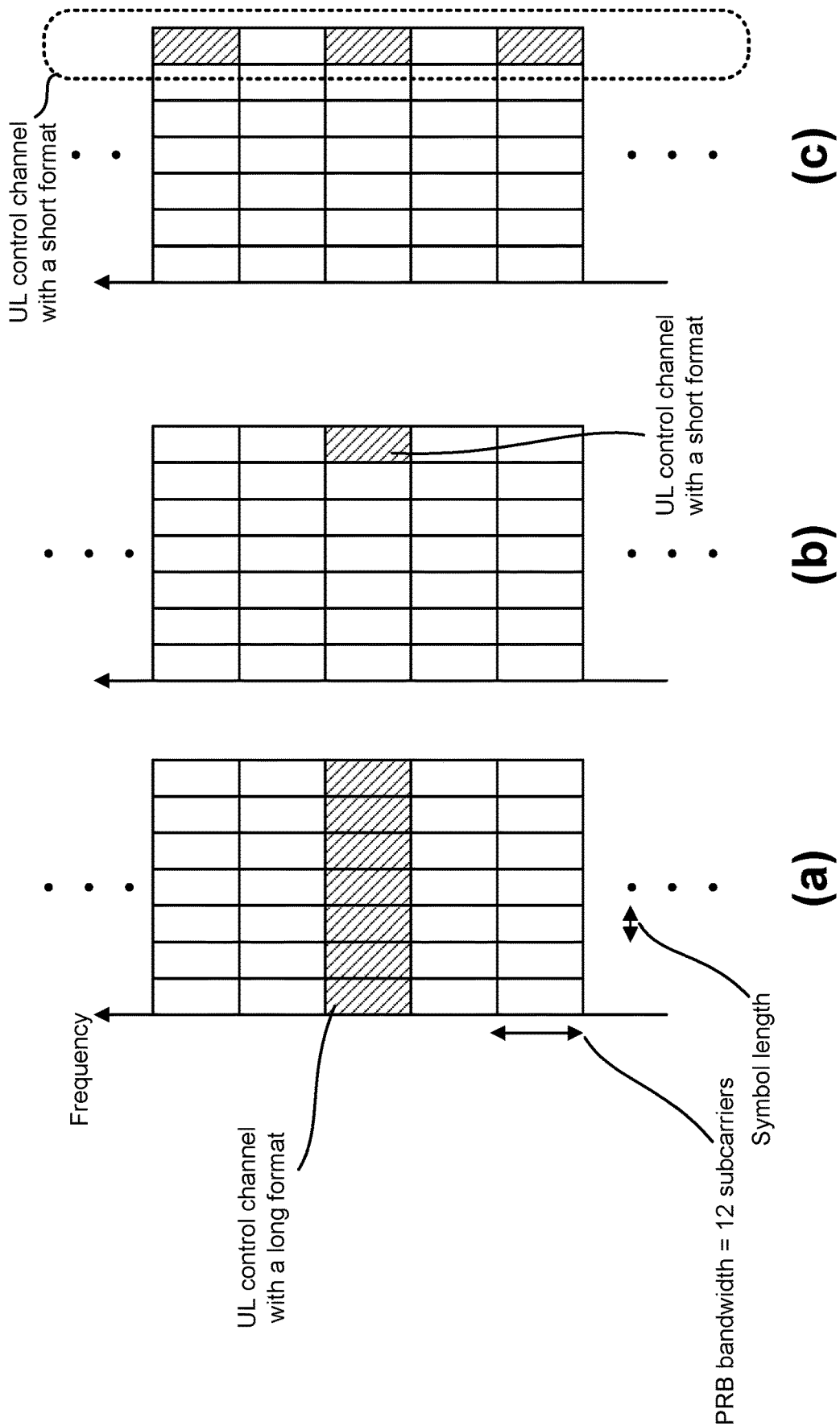
FIG. 17 shows examples of UL control channel structures.

FIG. 17 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, namely the UL control channel may be mapped to every N PRBs (e.g. 5 or 10) within a system bandwidth.

Figure 18:
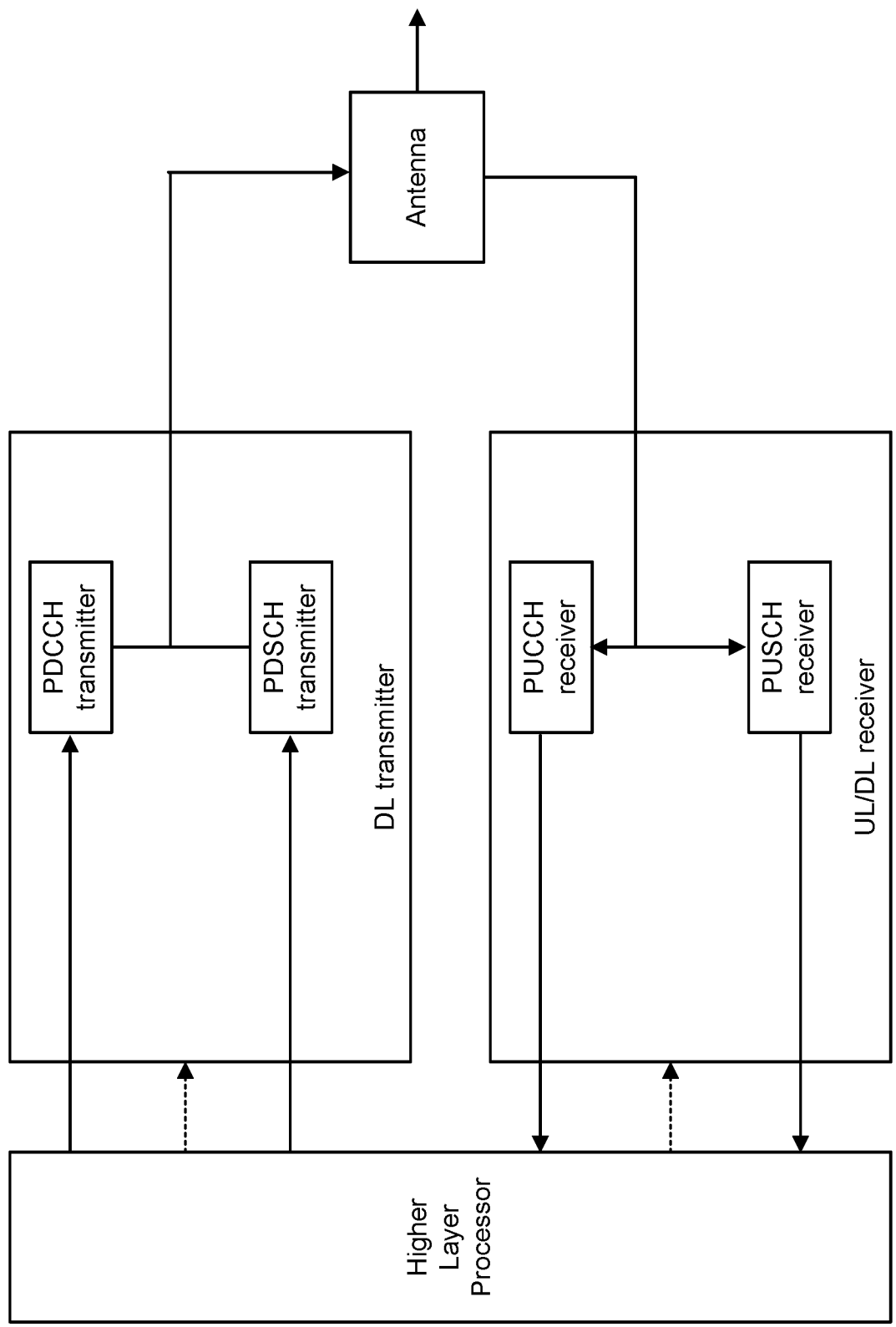
FIG. 18 is a block diagram illustrating one implementation of a gNB.

FIG. 18 is a block diagram illustrating one implementation of a gNB 1860. The gNB 1860 may include a higher layer processor, a DL transmitter, a UL receiver, and antennas. The DL transmitter may include a PDCCH transmitter and a PDSCH transmitter. The UL receiver may include a PUCCH receiver and a PUSCH receiver. The higher layer processor may manage physical layer's behaviors (the DL transmitter's and the UL receiver's behaviors) and provide higher layer parameters to the physical layer. The higher layer processor may obtain transport blocks from the physical layer. The higher layer processor may send/acquire higher layer messages such as an RRC message and MAC message to/from a UE's higher layer. The higher layer processor may provide the PDSCH transmitter transport blocks and provide the PDCCH transmitter transmission parameters related to the transport blocks. The UL receiver may receive multiplexed uplink physical channels and uplink physical signals via receiving antennas and de-multiplex them. The PUCCH receiver may provide the higher layer processor UCI. The PUSCH receiver may provide the higher layer processor received transport blocks.

Figure 19:
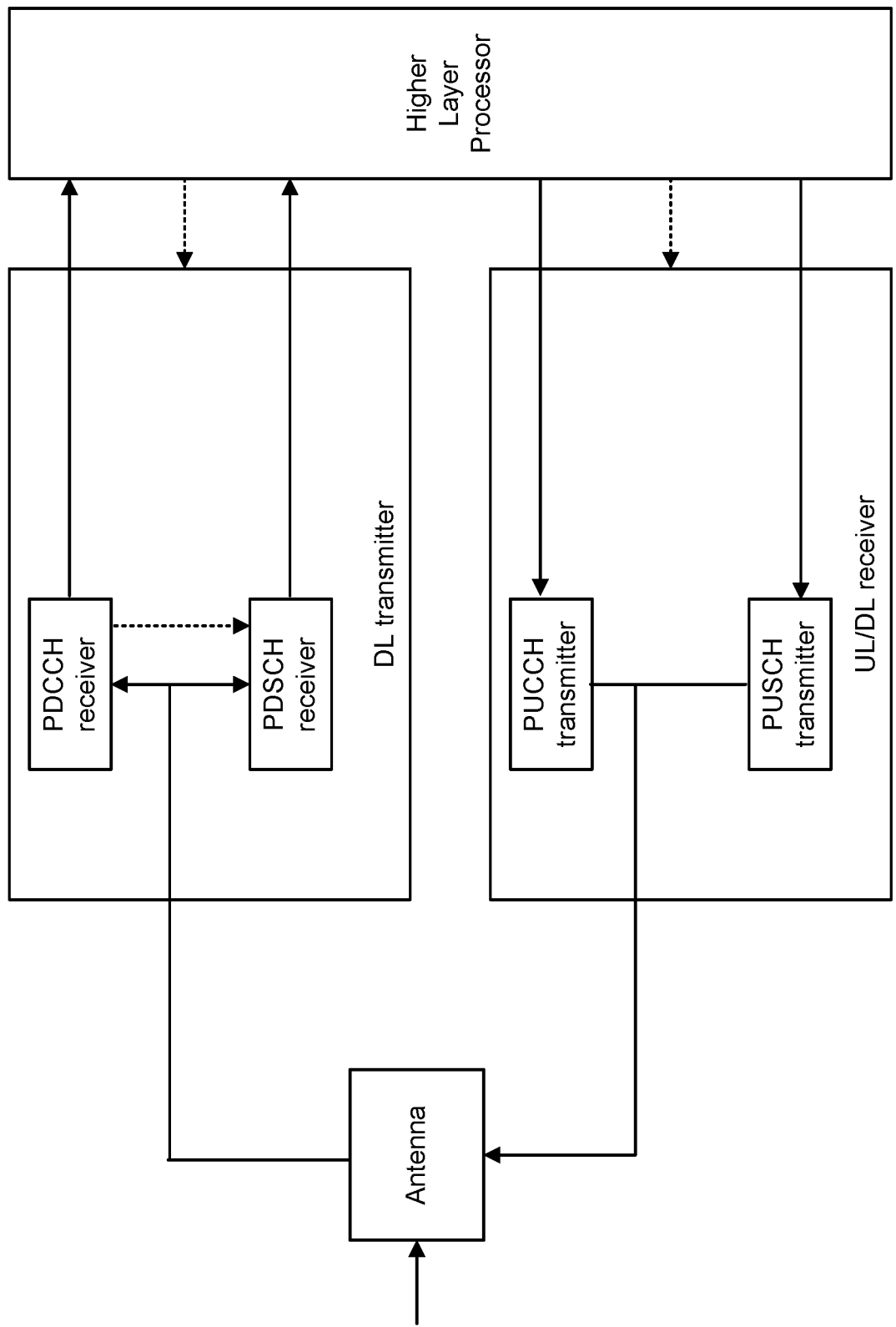
FIG. 19 is a block diagram illustrating one implementation of a UE.

FIG. 19 is a block diagram illustrating one implementation of a UE 1902. The UE 1902 may include a higher layer processor, a UL transmitter, a DL receiver, and antennas. The UL transmitter may include a PUCCH transmitter and a PUSCH transmitter. The DL receiver may include a PDCCH receiver and a PDSCH receiver. The higher layer processor may manage physical layer's behaviors (the UL transmitter's and the DL receiver's behaviors) and provide higher layer parameters to the physical layer. The higher layer processor may obtain transport blocks from the physical layer. The higher layer processor may send/acquire higher layer messages such as an RRC message and MAC message to/from a UE's higher layer. The higher layer processor may provide the PUSCH transmitter transport blocks and provide the PUCCH transmitter UCI. The DL receiver may receive multiplexed downlink physical channels and downlink physical signals via receiving antennas and de-multiplex them. The PDCCH receiver may provide the higher layer processor DCI. The PDSCH receiver may provide the higher layer processor received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 20:
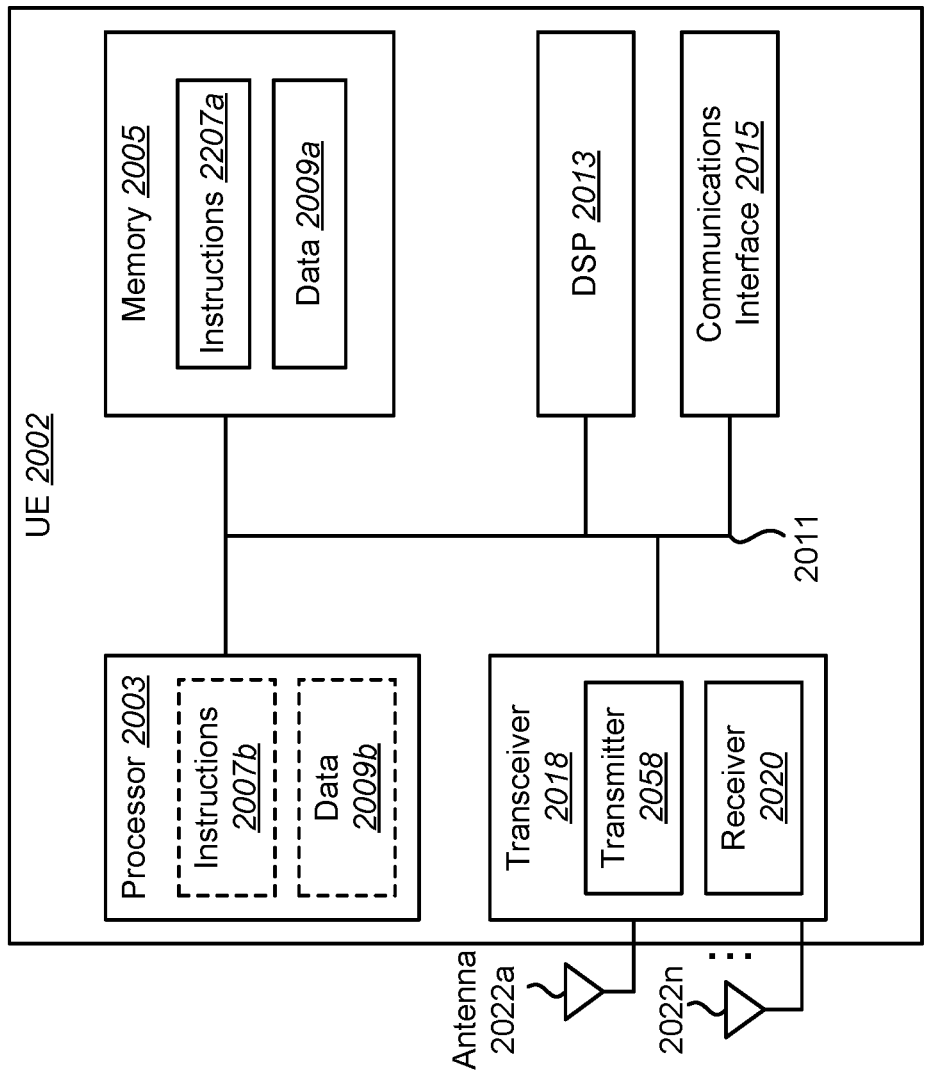
FIG. 20 illustrates various components that may be utilized in a UE.

FIG. 20 illustrates various components that may be utilized in a UE 2002. The UE 2002 described in connection with FIG. 20 may be implemented in accordance with the UE 102 described in connection with FIG. 1. The UE 2002 includes a processor 2003 that controls operation of the UE 2002. The processor 2003 may also be referred to as a central processing unit (CPU). Memory 2005, which may include read-only memory (ROM), random access memory (RAM), a combination of the two or any type of device that may store information, provides instructions 2007a and data 2009a to the processor 2003. A portion of the memory 2005 may also include non-volatile random access memory (NVRAM). Instructions 2007b and data 2009b may also reside in the processor 2003. Instructions 2007b and/or data 2009b loaded into the processor 2003 may also include instructions 2007a and/or data 2009a from memory 2005 that were loaded for execution or processing by the processor 2003. The instructions 2007b may be executed by the processor 2003 to implement the methods described above.

The UE 2002 may also include a housing that contains one or more transmitters 2058 and one or more receivers 2020 to allow transmission and reception of data. The transmitter(s) 2058 and receiver(s) 2020 may be combined into one or more transceivers 2018. One or more antennas 2022a-n are attached to the housing and electrically coupled to the transceiver 2018.

The various components of the UE 2002 are coupled together by a bus system 2011, which may include a power bus, a control signal bus and a status signal bus, in addition to a data bus. However, for the sake of clarity, the various buses are illustrated in FIG. 20 as the bus system 2011. The UE 2002 may also include a digital signal processor (DSP) 2013 for use in processing signals. The UE 2002 may also include a communications interface 2015 that provides user access to the functions of the UE 2002. The UE 2002 illustrated in FIG. 20 is a functional block diagram rather than a listing of specific components.

Figure 21:
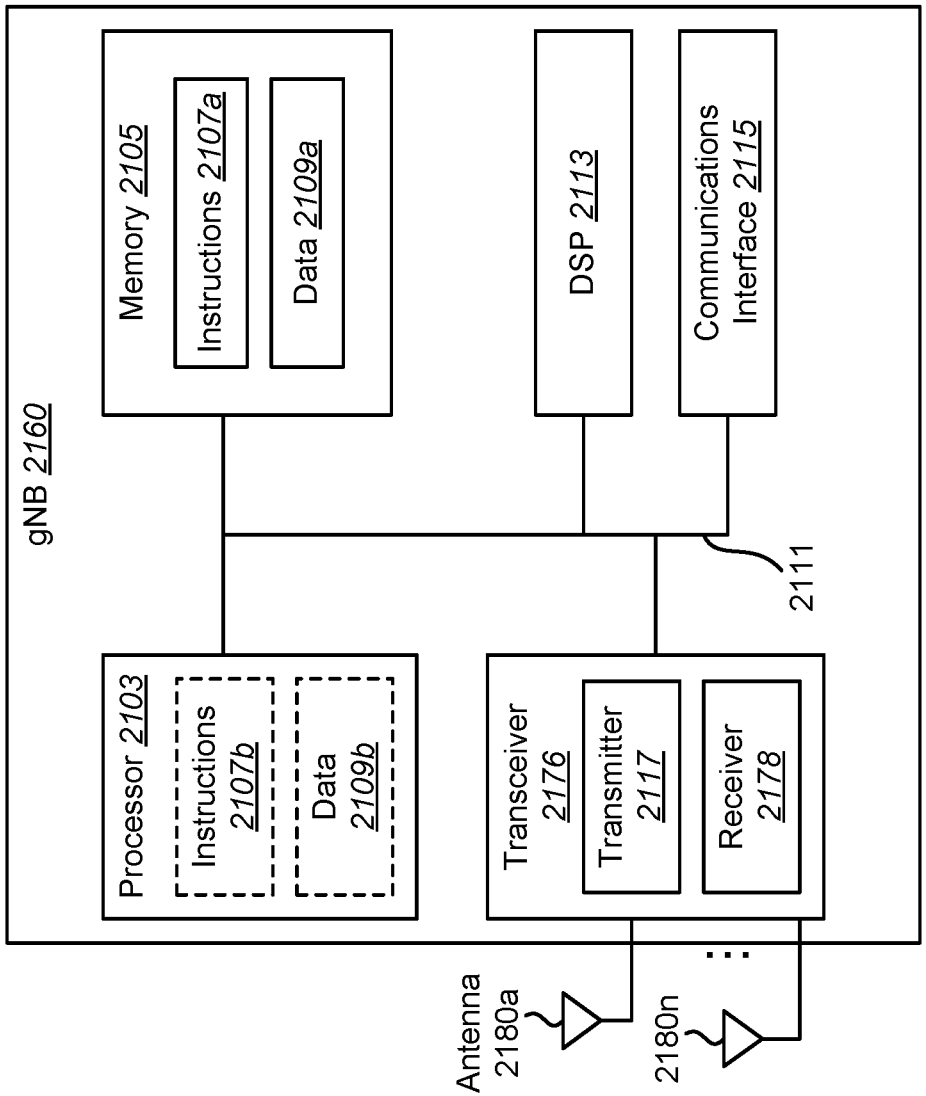
FIG. 21 illustrates various components that may be utilized in a gNB.

FIG. 21 illustrates various components that may be utilized in a gNB 2160. The gNB 2160 described in connection with FIG. 21 may be implemented in accordance with the gNB 160 described in connection with FIG. 1. The gNB 2160 includes a processor 2103 that controls operation of the gNB 2160. The processor 2103 may also be referred to as a central processing unit (CPU). Memory 2105, which may include read-only memory (ROM), random access memory (RAM), a combination of the two or any type of device that may store information, provides instructions 2107a and data 2109a to the processor 2103. A portion of the memory 2105 may also include non-volatile random access memory (NVRAM). Instructions 2107b and data 2109b may also reside in the processor 2103. Instructions 2107b and/or data 2109b loaded into the processor 2103 may also include instructions 2107a and/or data 2109a from memory 2105 that were loaded for execution or processing by the processor 2103. The instructions 2107b may be executed by the processor 2103 to implement the methods described above.

The gNB 2160 may also include a housing that contains one or more transmitters 2117 and one or more receivers 2178 to allow transmission and reception of data. The transmitter(s) 2117 and receiver(s) 2178 may be combined into one or more transceivers 2176. One or more antennas 2180a-n are attached to the housing and electrically coupled to the transceiver 2176.

The various components of the gNB 2160 are coupled together by a bus system 2111, which may include a power bus, a control signal bus and a status signal bus, in addition to a data bus. However, for the sake of clarity, the various buses are illustrated in FIG. 21 as the bus system 2111. The gNB 2160 may also include a digital signal processor (DSP) 2113 for use in processing signals. The gNB 2160 may also include a communications interface 2115 that provides user access to the functions of the gNB 2160. The gNB 2160 illustrated in FIG. 21 is a functional block diagram rather than a listing of specific components.

Figure 22:
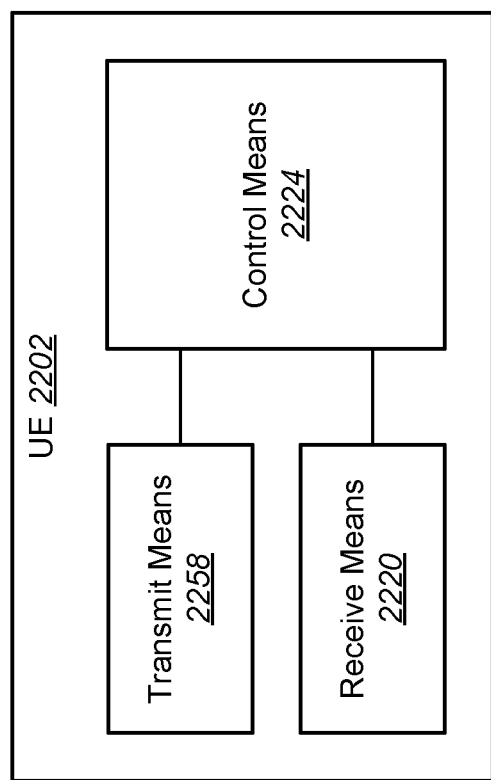
FIG. 22 is a block diagram illustrating one implementation of a UE in which systems and methods for UE-based expedited HO may be implemented.

FIG. 22 is a block diagram illustrating one implementation of a UE 2202 in which systems and methods for UE-based expedited handoff (HO) may be implemented. The UE 2202 includes transmit means 2258, receive means 2220 and control means 2224. The transmit means 2258, receive means 2220 and control means 2224 may be configured to perform one or more of the functions described in connection with FIG. 1 above. FIG. 20 above illustrates one example of a concrete apparatus structure of FIG. 22. Other various structures may be implemented to realize one or more of the functions of FIG. 1. For example, a DSP may be realized by software.

Figure 23:
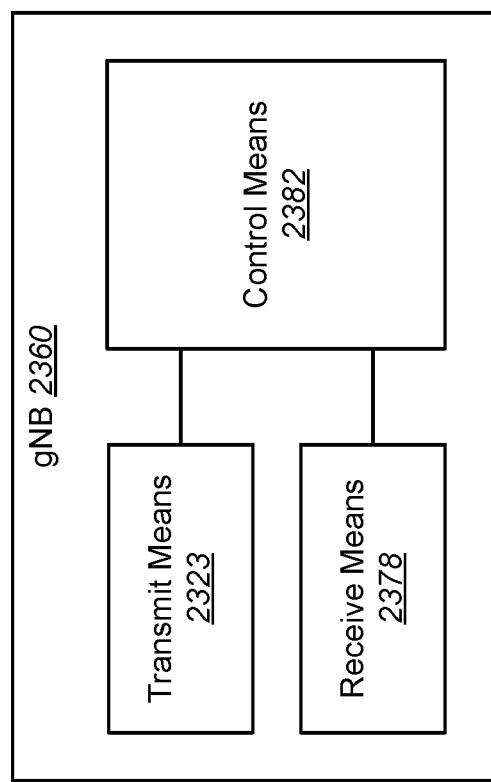
FIG. 23 is a block diagram illustrating one implementation of a gNB in which systems and methods for UE-based expedited HO may be implemented.

FIG. 23 is a block diagram illustrating one implementation of a gNB 2360 in which systems and methods for UE-based expedited handoff (HO) may be implemented. The gNB 2360 includes transmit means 2317, receive means 2378 and control means 2382. The transmit means 2317, receive means 2378 and control means 2382 may be configured to perform one or more of the functions described in connection with FIG. 1 above. FIG. 21 above illustrates one example of a concrete apparatus structure of FIG. 23. Other various structures may be implemented to realize one or more of the functions of FIG. 1. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A 5G new radio (NR) UE equipment (UE), comprising:
a processor; and
memory in electronic communication with the processor, wherein instructions stored in the memory are executable to:
perform a UE-initiated handoff (HO) procedure after receiving a radio resource control (RRC) message from a base station (gNB) instructing the UE to activate a UE-based HO feature to allow the UE to decide whether to perform the UE-initiated HO procedure based on measurements made by the UE, wherein the UE-initiated HO procedure comprises a PULL mechanism in handoff, wherein in the PULL mechanism a target gNB receives a Random Access Request with a Handoff indication, wherein in the PULL mechanism a target gNB receives a HO-based Random Access Request including a Handoff Vector, and wherein in the PULL mechanism a target gNB informs the Source gNB of impending HO, and prepares the HO process by establishing a Data Forwarding Tunnel and requesting UE contexts.

2. The UE of claim 1, wherein the UE-initiated HO procedure further comprises a PUSH mechanism indicating to a source gNB its handoff decision, and wherein the UE-initiated HO procedure informs the source gNB with a target gNB ID.

3. The UE of claim 2, wherein in the PUSH mechanism, a source gNB performs HO preparation procedures by establishing a forwarding tunnel and pushing UE contexts to the target gNB, and wherein in the PUSH mechanism, the UE receives a Security Handoff Vector generated by the target gNB.

4. The UE of claim 3, wherein in the PUSH mechanism, the UE sends the Security Handoff Vector to the target gNB during the synchronization and HO-based Random access procedure.

5. The UE of claim 4, wherein in the PUSH mechanism, the UE sends an Indication that this Random Access is Handoff-Based to the target gNB.

6. The UE of claim 5, wherein in the PUSH mechanism, the UE may continue to use source gNB keys to receive and transmit data relayed/forwarded through the Target gNB.

7. The UE of claim 5, wherein in the PUSH mechanism, the UE updates its keys with the Target gNB.

8. The UE of claim 1, wherein in the PULL mechanism, the UE may continue to use source gNB keys to receive and transmit data relayed/forwarded through the Target gNB.

9. The UE of claim 8, wherein in the PULL mechanism, the UE updates its keys with the Target gNB.

10. The UE of claim 1, wherein the UE-initiated HO procedure comprises using a handoff vector to expedite UE validation and access in a target gNB.

11. The UE of claim 1, wherein the UE-initiated HO procedure comprises relaying UE plane data between a source gNB and a target gNB using source gNB keys.

12. The UE of claim 1, wherein the UE-initiated HO procedure comprises establishing target gNB keys with the UE and establishing a backbone connection between a target gNB and CN in the background while the UE data is continuously flowing through the target gNB and over the air.

13. A 5G new radio (NR) Base Station (gNB), comprising:
a processor; and
memory in electronic communication with the processor, wherein instructions stored in the memory are executable to:
perform a UE-initiated handoff (HO) procedure after sending a radio resource control (RRC) message to a user equipment (UE) instructing the UE to activate a UE-based HO feature to allow the UE to decide whether to perform the UE-initiated HO procedure based on measurements made by the UE, wherein the UE-initiated HO procedure comprises a PULL mechanism in handoff, wherein in the PULL mechanism a target gNB receives a Random Access Request with a Handoff indication, wherein in the PULL mechanism a target gNB receives a HO-based Random Access Request including a Handoff Vector, and wherein in the PULL mechanism a target gNB informs the Source gNB of impending HO, and prepares the HO process by establishing a Data Forwarding Tunnel and requesting UE contexts.

14. The gNB of claim 13, wherein the UE-initiated HO procedure further comprises a PUSH mechanism in handoff, and wherein in the PUSH mechanism, a source gNB receives HO indication from the UE with the target gNB ID, performs HO procedures by establishing a forwarding tunnel and forwarding UE contexts with the target gNB.

15. The gNB of claim 13, wherein the target gNB sends the handoff vector to the Source gNB as credentials and validation of UE-initiated HO procedure, and wherein the UE-initiated HO procedure comprises relaying/Forwarding UE plane data between a source gNB and a target gNB using source gNB keys.

16. The gNB of claim 13, wherein the UE-initiated HO procedure comprises establishing target gNB keys with the UE and establishing a backbone connection between a target gNB and CN in the background while the UE data is continuously flowing through the target gNB and over the air.

* * * * *